US011927353B2

United States Patent
Atchison et al.

(10) Patent No.: US 11,927,353 B2
(45) Date of Patent: Mar. 12, 2024

(54) BUILDING EQUIPMENT WITH INTERACTIVE OUTDOOR DISPLAY

(71) Applicant: Johnson Controls Tyco IP Holdings LLP, Milwaukee, WI (US)

(72) Inventors: Shaun B. Atchison, Wichita, KS (US); Theresa N. Gillette, Wichita, KS (US); John W. Uerkvitz, Valley Center, KS (US); Aneek M. Noor, Wichita, KS (US); Brian D. Rigg, Douglass, KS (US); Jedidiah O. Bentz, Witchita, KS (US); Tyler Mccune, El Dorado, KS (US); Tom R. Tasker, Andover, KS (US); Shawn A. Hern, Park City, KS (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 637 days.

(21) Appl. No.: 17/007,993

(22) Filed: Aug. 31, 2020

(65) Prior Publication Data

US 2020/0400324 A1    Dec. 24, 2020

Related U.S. Application Data

(63) Continuation of application No. 15/417,177, filed on Jan. 26, 2017, now abandoned.
(Continued)

(51) Int. Cl.
*F24F 1/22*    (2011.01)
*F24F 1/06*    (2011.01)
(Continued)

(52) U.S. Cl.
CPC ............... *F24F 11/30* (2018.01); *F24F 1/06* (2013.01); *F24F 1/20* (2013.01); *F24F 1/22* (2013.01);
(Continued)

(58) Field of Classification Search
CPC ...... F24F 1/06; F24F 1/20; F24F 11/50; F24F 11/52; F24F 11/523; F24F 1/58; F24F 2013/207
See application file for complete search history.

(56) References Cited

U.S. PATENT DOCUMENTS 1,906,131 A    4/1933  Baylis
4,328,680 A    5/1982  Stamp et al.
(Continued)

FOREIGN PATENT DOCUMENTS

EP    1 811 240    7/2007
EP    2 045 538    4/2009

OTHER PUBLICATIONS

Moto G (1st Generation), Wikipedia, URL: https://en.wikipedia.org/wiki/Moto_G_(1st_generation), retrieved Jan. 23, 2020, 8 pages.
(Continued)

*Primary Examiner* — Jerry-Daryl Fletcher
*Assistant Examiner* — Daniel C Comings
(74) *Attorney, Agent, or Firm* — Foley & Lardner LLP

(57) ABSTRACT

An outdoor unit for a building HVAC system includes one or more sensors configured to measure temperature and pressure values. The unit also includes a user interface coupled to the outdoor unit. The user interface is configured to display information to a user. The unit includes a controller including a processing circuit. The processing circuit configured to record the temperature values and the pressure values via the sensors and cause the user interface to display temperature values and pressure values.

20 Claims, 13 Drawing Sheets

Related U.S. Application Data

(60) Provisional application No. 62/421,201, filed on Nov. 11, 2016, provisional application No. 62/367,392, filed on Jul. 27, 2016, provisional application No. 62/367,612, filed on Jul. 27, 2016, provisional application No. 62/367,311, filed on Jul. 27, 2016.

(51) Int. Cl.
| | | |
|---|---|---|
| *F24F 1/20* | (2011.01) | |
| *F24F 11/30* | (2018.01) | |
| *F24F 11/52* | (2018.01) | |
| *F24F 11/58* | (2018.01) | |
| *F24F 110/10* | (2018.01) | |
| *F24F 120/20* | (2018.01) | |
| *F24F 140/12* | (2018.01) | |
| *F24F 140/20* | (2018.01) | |
| *F24F 140/40* | (2018.01) | |
| *F24F 140/60* | (2018.01) | |
| *F25B 49/02* | (2006.01) | |
| *G06F 16/2457* | (2019.01) | |

(52) U.S. Cl.
CPC .............. *F24F 11/52* (2018.01); *F24F 11/58* (2018.01); *F24F 2110/10* (2018.01); *F24F 2120/20* (2018.01); *F24F 2140/12* (2018.01); *F24F 2140/20* (2018.01); *F24F 2140/40* (2018.01); *F24F 2140/60* (2018.01); *F25B 49/02* (2013.01); *G06F 16/24573* (2019.01)

(56) References Cited

U.S. PATENT DOCUMENTS

| | | | |
|---|---|---|---|
| 4,563,877 A | 1/1986 | Harnish | |
| 4,573,326 A | 3/1986 | Sulfstede et al. | |
| 4,590,771 A | 5/1986 | Shaffer et al. | |
| 4,653,285 A | 3/1987 | Pohl | |
| 4,724,678 A | 2/1988 | Pohl | |
| 4,751,825 A | 6/1988 | Voorhis et al. | |
| 4,882,908 A | 11/1989 | White | |
| 4,884,414 A | 12/1989 | Bos | |
| 4,942,613 A | 7/1990 | Lynch | |
| 5,319,943 A | 6/1994 | Bahel et al. | |
| 5,410,230 A | 4/1995 | Bessler et al. | |
| 5,469,715 A | 11/1995 | Janke et al. | |
| 5,490,556 A | 2/1996 | Pichotta | |
| 5,507,154 A | 4/1996 | Grant | |
| 5,511,724 A | 4/1996 | Freiberger et al. | |
| 5,515,689 A | 5/1996 | Atterbury | |
| 5,651,264 A * | 7/1997 | Lo .......................... | F24F 11/30 236/78 D |
| 5,765,382 A | 6/1998 | Manning et al. | |
| 6,223,544 B1 | 5/2001 | Seem | |
| 6,260,765 B1 | 7/2001 | Natale et al. | |
| 6,318,095 B1 | 11/2001 | Guo et al. | |
| 6,438,922 B1 | 8/2002 | Delefevre | |
| 6,976,366 B2 | 12/2005 | Starling et al. | |
| 7,129,432 B2 | 10/2006 | Fujii et al. | |
| 7,296,426 B2 * | 11/2007 | Butler ...................... | F24F 11/42 236/1 C |
| 7,334,424 B2 | 2/2008 | Park et al. | |
| 7,383,158 B2 | 6/2008 | Krocker et al. | |
| 7,469,550 B2 | 12/2008 | Chapman et al. | |
| 7,975,494 B2 * | 7/2011 | Boydstun ................. | F24F 11/30 236/94 |
| 8,417,386 B2 | 4/2013 | Douglas et al. | |
| 8,550,368 B2 | 10/2013 | Butler et al. | |
| 8,620,841 B1 | 12/2013 | Filson et al. | |
| 8,783,048 B2 | 7/2014 | Edens et al. | |
| 8,830,267 B2 | 9/2014 | Brackney | |
| 8,878,854 B2 | 11/2014 | Bias et al. | |
| 9,080,785 B2 | 7/2015 | Kim et al. | |
| 9,163,850 B2 | 10/2015 | Kim et al. | |
| 9,285,802 B2 | 3/2016 | Arensmeier | |
| 9,412,328 B2 | 8/2016 | Vie et al. | |
| 9,448,008 B2 * | 9/2016 | Lee .......................... | F25B 49/02 |
| 9,964,345 B2 | 5/2018 | Vie et al. | |
| 10,041,721 B2 | 8/2018 | Qu et al. | |
| 2001/0025349 A1 | 9/2001 | Sharood et al. | |
| 2002/0020175 A1 | 2/2002 | Street et al. | |
| 2002/0139135 A1 | 10/2002 | Noritake | |
| 2002/0175213 A1 | 11/2002 | Wodeslavsky | |
| 2003/0146522 A1 | 8/2003 | Crawley | |
| 2003/0154732 A1 | 8/2003 | Bassi | |
| 2004/0035475 A1 | 2/2004 | Bradford et al. | |
| 2004/0154319 A1 | 8/2004 | Jayanth et al. | |
| 2004/0249479 A1 | 12/2004 | Shorrock | |
| 2006/0144055 A1 | 7/2006 | Ahn | |
| 2006/0201042 A1 | 9/2006 | Kim et al. | |
| 2006/0201168 A1 | 9/2006 | Kates | |
| 2007/0045431 A1 | 3/2007 | Chapman et al. | |
| 2008/0072611 A1 * | 3/2008 | Ahmed .................... | F25B 49/02 62/132 |
| 2009/0241577 A1 | 10/2009 | Fukushima et al. | |
| 2009/0266903 A1 | 10/2009 | Fitzgerald et al. | |
| 2009/0277205 A1 | 11/2009 | Matsuda et al. | |
| 2010/0070234 A1 | 3/2010 | Steinberg et al. | |
| 2012/0179727 A1 | 7/2012 | Esser | |
| 2012/0252430 A1 | 10/2012 | Imes et al. | |
| 2013/0145784 A1 | 6/2013 | Bias et al. | |
| 2013/0147812 A1 | 6/2013 | Bias et al. | |
| 2014/0034284 A1 | 2/2014 | Butler et al. | |
| 2014/0074730 A1 | 3/2014 | Arensmeier et al. | |
| 2014/0245770 A1 | 9/2014 | Chen et al. | |
| 2014/0262130 A1 | 9/2014 | Yenni et al. | |
| 2014/0262196 A1 | 9/2014 | Frank et al. | |
| 2014/0316581 A1 | 10/2014 | Fadell et al. | |
| 2015/0184921 A1 | 7/2015 | Vie et al. | |
| 2015/0198345 A1 | 7/2015 | Bicknell | |
| 2015/0241316 A1 * | 8/2015 | Ulrich .................... | H01L 23/473 340/626 |
| 2015/0308879 A1 * | 10/2015 | Pistone .................... | F25B 45/00 73/292 |
| 2015/0323208 A1 * | 11/2015 | Son .......................... | F24F 11/30 165/250 |
| 2015/0362207 A1 | 12/2015 | Abiprojo et al. | |
| 2015/0370927 A1 | 12/2015 | Flaherty et al. | |
| 2016/0121251 A1 | 5/2016 | Baek et al. | |
| 2016/0169571 A1 | 6/2016 | Kimura et al. | |
| 2016/0180347 A1 | 6/2016 | Greene et al. | |
| 2016/0313039 A1 * | 10/2016 | Popli ........................ | F24F 11/30 |
| 2016/0377309 A1 | 12/2016 | Abiprojo et al. | |
| 2017/0018007 A1 | 1/2017 | Defrank et al. | |
| 2017/0051958 A1 | 2/2017 | Gao et al. | |
| 2017/0082308 A1 | 3/2017 | Gokhale et al. | |
| 2017/0238153 A1 | 8/2017 | Daoud et al. | |
| 2018/0139069 A1 | 5/2018 | Rawlins et al. | |
| 2018/0164019 A1 | 6/2018 | Langenberg et al. | |

OTHER PUBLICATIONS

Motorola Flip Shell for Moto G—Retail Packaging, URL: https://www.amazon.com/dp/B00G3PLUQE/ref=pe_385040_303321900_TE_M3T1_ST1_dp_1, retrieved on Jan. 23, 2020, 7 pages.

* cited by examiner

BUILDING EQUIPMENT WITH INTERACTIVE OUTDOOR DISPLAY

CROSS-REFERENCE TO RELATED PATENT APPLICATIONS

This application is a continuation of U.S. patent application Ser. No. 15/417,177 filed Jan. 26, 2017 which claims the benefit of and priority to U.S. Provisional Patent Application No. 62/367,612 filed Jul. 27, 2016, U.S. Provisional Patent Application No. 62/367,311 filed Jul. 27, 2016, U.S. Provisional Patent Application No. 62/367,392 filed Jul. 27, 2016 and U.S. Provisional Patent Application No. 62/421,201 filed Nov. 11, 2016. The entire disclosure of each of these patent applications is incorporated by reference herein.

BACKGROUND

An heating, ventilation, and air conditioning (HVAC) unit may be used to heat and/or cool a building. Residential and/or commercial HVAC units may be heat pumps (HPs) and/or air conditioners (ACs) (e.g., an AC/HP unit). Various residential units may utilize a variable speed compressor. A variable speed compressor may use a variable speed drive to control rotations per minute (RPM) of a compressor. When HVAC units experience faults or cease to function properly, a technician may need to diagnose the faults and repair the residential unit accordingly.

SUMMARY

One implementation of the present disclosure is an outdoor unit for a building HVAC system. The unit includes one or more sensors configured to measure temperature and pressure values. The unit also includes a user interface coupled to the outdoor unit. The user interface is configured to display information to a user. The unit includes a controller including a processing circuit. The processing circuit configured to record the temperature values and the pressure values via the sensors and cause the user interface to display temperature values and pressure values.

In some embodiments, the processing circuit is configured to determine a subcool value and a superheat value for the HVAC system based on the temperature values and the pressure values and cause the user interface to display the subcool value and the superheat value.

In some embodiments, the outdoor unit further includes a door switch. In some embodiments, the processing circuit is configured to determine if the door switch is activated or deactivated and turn the user interface on if the switch is activated and turn the user interface off if the switch is deactivated.

In some embodiments, the outdoor unit further includes an enclosure and a door. The door may be attached to the enclosure and covers the user interface. The door switch may be activated and deactivated based on the position of the door.

In some embodiments, the door includes a connector and the enclosure includes a connector receiver. In some embodiments, the connector and the connector receiver are structured to hold the door to the enclosure when the door is closed.

In some embodiments, the processing circuit is configured to determine a compressor speed of a compressor of the outdoor unit and cause the user interface to display the compressor speed.

In some embodiments, the user interface is configured to receive input from a user. In some embodiments, the processing circuit is configured to select an operating mode for the outdoor unit based on input received via the user interface.

In some embodiments, the temperature sensors include temperature sensors configured to measure refrigerant temperature of a liquid line, a discharge line and a suction line of the HVAC system.

In some embodiments, the pressure sensors include pressure sensors configured to measure refrigerant pressure of a liquid line, a discharge line and a suction line of the HVAC system.

In some embodiments, the processing circuit is configured to cause the user interface to display the liquid line pressure, the discharge line pressure, the suction line pressure, the liquid line temperature, the discharge line temperature, and the suction line temperature.

In some embodiments, the outdoor unit includes one or more fans. The processing circuit may be configured to determine an airflow value and a fan speed value of the fans and cause the user interface to display the airflow values and the fan speed values.

In some embodiments, the processing circuit is configured to determine the airflow values of the one or more fans based on a flow meter.

In some embodiments, the outdoor unit further includes a variable speed drive configured to control a compressor of the outdoor unit and one or more sensors configured to measure power consumption of the variable speed drive. In some embodiments, the processing circuit is configured to determine the power consumption of the variable speed drive via the one or more sensors and cause the user interface to display the measured power consumption.

In some embodiments, outdoor unit further includes an electronic expansion valve (EEV). In some embodiments, the processing circuit is configured to determine a step value of the EEV and cause the user interface to display the step value of the EEV.

In some embodiments, the outdoor unit is configured to determine if the HVAC system is properly charged via the temperature sensors and the pressure sensors and cause the user interface to display an indication of the charge of the HVAC system.

Another implementation of the present disclosure is a method for operating an outdoor controller of an HVAC system. The method includes recording, via the controller, temperature values and pressure values of the HVAC system via temperature sensors and pressure sensors. The method further includes causing, via the controller, a user interface to display the temperature values and the pressure values. The method includes determining, via the controller, a subcool value and a superheat value for the HVAC system based on the temperature values and the pressure values and causing, via the controller, the user interface to display the subcool value and the superheat value. The method further includes determining, via the controller, if a door switch is activated or deactivated and causing, via the controller, the user interface to turn on in response to determining that the door switch is activated. The method includes causing, via the controller, the user interface to turn off in response to determining that the door switch is deactivated.

In some embodiments, the door switch is activated and deactivated based on a position of a door. In some embodiments, the door is connected to an enclosure of the outdoor controller.

In some embodiments, the method further includes determining, via the controller, a compressor speed of a compressor of the HVAC system and causing, via the controller, the user interface to display the compressor speed.

In some embodiments, the user interface is configured to receive input from a user. In some embodiments, the processing circuit is configured to select an operating mode for the outdoor unit based on input received via the user interface.

In some embodiments, the temperature sensors including temperature sensors configured to measure refrigerant temperature of a liquid line, a discharge line and a suction line of the HVAC system. In some embodiments, the pressure sensors include pressure sensors configured to measure refrigerant pressure of a liquid line, a discharge line and a suction line of the HVAC system.

In some embodiments, the method further includes causing, via the controller, the user interface to display the liquid line pressure, the discharge line pressure, the suction line pressure, the liquid line temperature, the discharge line temperature, and the suction line temperature.

In some embodiments, the method further includes determining, via the controller, an airflow value and a fan speed value of one or more fans of the HVAC system and causing, via the controller, the user interface to display the airflow values and the fan speeds. In some embodiments, determining, via the controller, the airflow values includes determining the airflow values of the one or more fans based on one or more flow meters.

In some embodiments, the method further includes determining, via the controller, the power consumption of a variable speed drive measured by one or more sensors and causing, via the controller, the user interface to display the measured power consumption.

Another implementation of the present disclosure is an air conditioner and heat pump (AC/HP) unit for a building HVAC system. The unit includes one or more sensors configured to measure temperature and pressure. The unit further includes a variable speed drive configured to control a compressor of the AC/HP unit and a current sensor and a voltage sensor configured to measure the power consumption of the variable speed drive. The unit further includes a user interface coupled to the outdoor unit. The user interface is configured to display information to a user. The unit further includes a controller including a processing circuit. The processing circuit is configured to cause the user interface to display the measured temperature values and the measured pressure values. The processing circuit is further configured to determine a subcool value and a superheat value based on the measured temperature values and the measured pressure values and cause the user interface to display the subcool value and the superheat value. The processing circuit is further configured to determine the power consumption of the variable speed drive based on the measured power consumption of the variable speed drive and cause the user interface to display the power consumption.

In some embodiments, the unit further includes a door switch. The processing circuit is configured to determine if the door switch is activated or deactivate and turn the user interface on if the switch is activated and turn the user interface off if the switch is deactivated.

In some embodiments, the AC/HP unit further includes an enclosure and a door. The door may be attached to the enclosure and covers the user interface. In some embodiments, the door switch is activated and deactivated based on the position of the door.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for operating an interactive outdoor display of an outdoor unit (e.g., an air conditioner or heat pump (AC/HP)) are shown, according to various exemplary embodiments. In some embodiments, the outdoor unit includes an outdoor controller. In this regard, the outdoor controller can be configured to measure various system parameters (e.g., temperatures, pressures, power consumption of various components, etc.). The outdoor controller can be configured to cause the interactive outdoor display to display the various measured system parameters. Further, the outdoor controller can be configured to cause the interactive outdoor display to display various system values, such as values that the outdoor controller is causing the outdoor unit to operate at. These values may be fan speeds, electronic expansion valve setpoints, compressor speeds, etc.

In various embodiments, the interactive outdoor display is coupled to an enclosure of the outdoor unit and/or is located inside the enclosure of the outdoor unit. In this regard, the interactive outdoor display may be shielded from rain, snow, and/or weather element which may damage the interactive outdoor display. To access the interactive outdoor display, a cover and/or hinged door may be attached to the enclosure. In this regard, a technician may be able to access the interactive outdoor display by removing the cover and/or opening the hinged door while the interactive outdoor display is still protected from weather elements. Further, the interactive outdoor display may include a door switch. The door switch may be coupled to the outdoor controller. The outdoor controller can be configured to turn the interactive outdoor display on and/or off based on whether the door switch is activated or deactivated. In some embodiments, the door switch senses the position of the cover and/or door so that when a technician opens the cover and/or door, the interactive outdoor display is automatically turned on and/or off.

Systems And Methods

Figure 1:
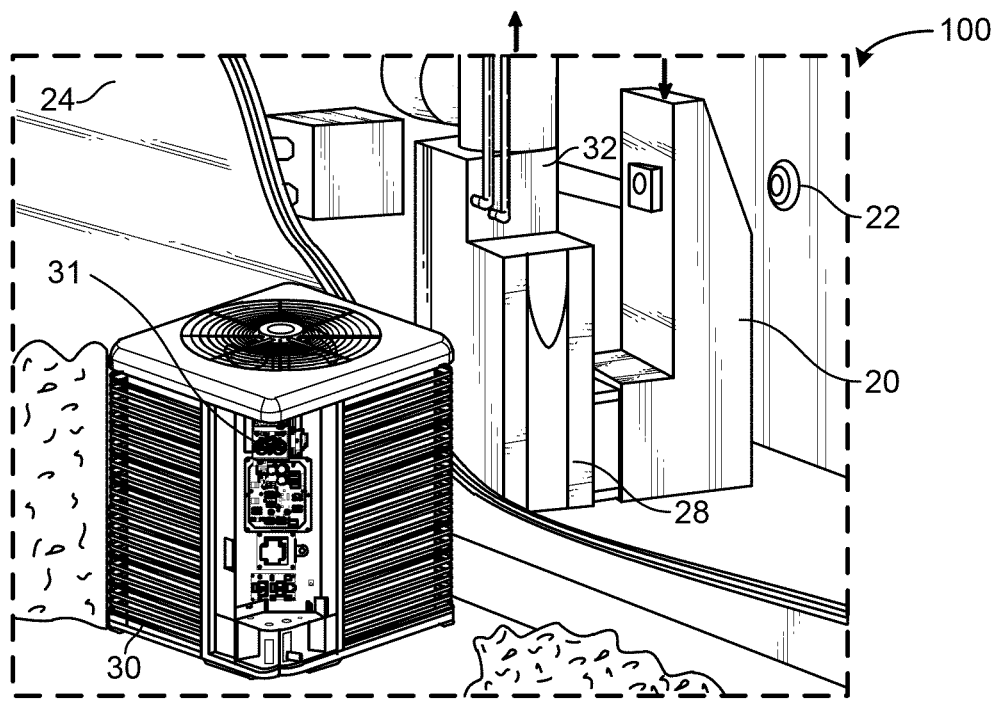
FIG. 1 is a schematic drawing of a building equipped with a residential heating and cooling system, according to an exemplary embodiment.

FIG. 1 illustrates a residential heating and cooling system 100. The residential heating and cooling system may provide heated and cooled air to a residential structure, as well as provide outside air for ventilation and provide improved indoor air quality (IAQ) through devices such as ultraviolet lights and air filters. Although described as a residential heating and cooling system, embodiments of the systems and methods described herein can be utilized in a cooling unit or a heating unit in a variety of applications include commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24 in some embodiments and is covered by a shroud, housing, and/or enclosure to protect the system components and to prevent leaves and other contaminants from entering the unit. Refrigerant conduits transfer refrigerant between indoor unit 28 and outdoor unit 30, typically transferring primarily liquid refrigerant in one direction and primarily vaporized refrigerant in an opposite direction.

When the system shown in FIG. 1 is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit, designated by the reference numeral 32, serves as an evaporator coil. Indoor coil 32 receives liquid refrigerant (which may be expanded by an expansion device, not shown) and evaporates the refrigerant before returning it to outdoor unit 30.

Outdoor unit 30 draws in environmental air through its sides, forces the air through the outer unit coil using a fan, and expels the air. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by thermostat 22. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit can stop the refrigeration cycle temporarily.

When the unit in FIG. 1 operates as a heat pump, the roles of the coils are reversed. That is, the coil of outdoor unit 30 serves as an evaporator to evaporate refrigerant and thereby cool air entering outdoor unit 30 as the air passes over the outdoor unit coil. Indoor coil 32 will receive a stream of air blown over it and will heat the air by condensing a refrigerant.

Outdoor unit 30 is shown to include user interface 31. The user interface 31 may be configured to display the current operating status of outdoor unit 30. In some embodiments, user interface 31 shows a suction pressure and a suction temperature, a discharge pressure and a discharge temperature, the current speed of a compressor of outdoor unit 30, the current airflow or speed of fans of outdoor unit 30, fault information, and/or any other operating status information. In various embodiments, user interface 31 allows a user to put outdoor unit 30 in various modes such as a test mode. A test mode may allow a user to override various safety features and timers of outdoor unit 30. Further, user interface 31 may recommend various amounts of charge to be added and/or removed from the system based on the superheat and/or subcool values.

In some embodiments user interface 31 is a visual trouble shooting tool, that shows the technician exactly what is wrong with the unit by display a graphic of outdoor unit 30 and coloring an afflicted component red. In some embodiments, the user will be able to tap on any panel (e.g., user interface 31) to "move" it away from the unit so the component in question can be accessed virtually, and have available a full unit diagram with removable panels, pressure switches, sensors, EEV control, copper joints, mechanical joints, motors, reversing valve, wiring trouble shooting, heat exchangers, distributer, limit switch, heating elements, performance, bad compression, core, etc. In some embodiments, user interface 31 may display the trouble shooting tool in addition to a mobile application on a mobile phone and/or tablet.

Figure 2:
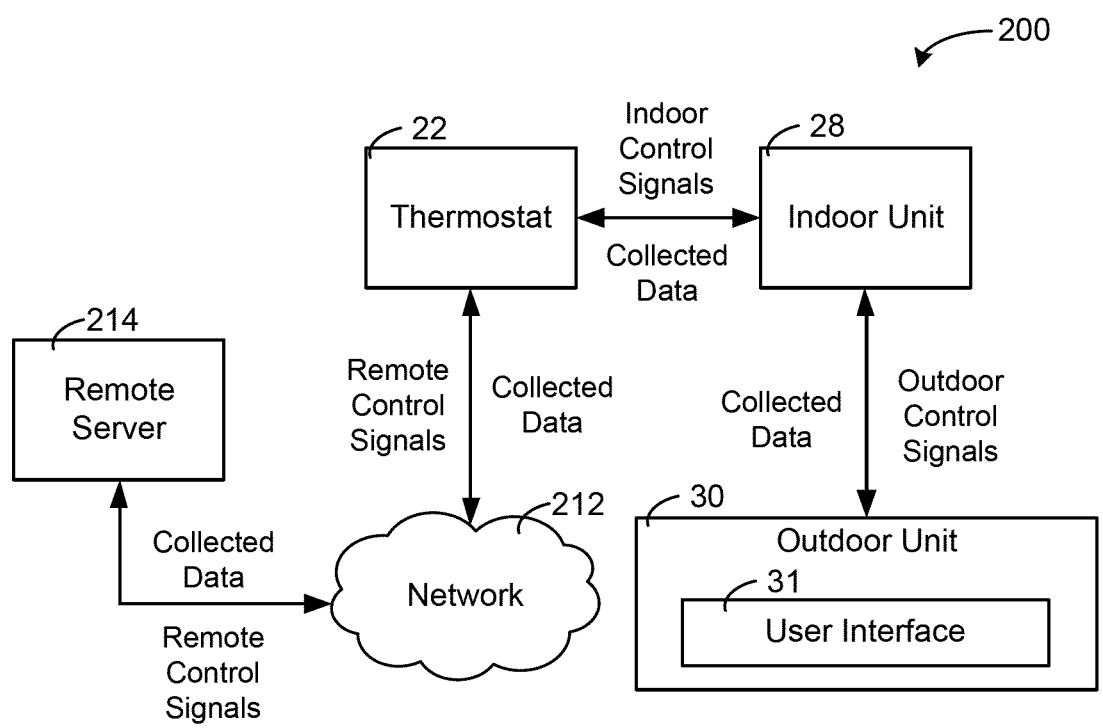
FIG. 2 is a block diagram of the components of the residence, according to an exemplary embodiment.

Referring now to FIG. 2, a block diagram of system 200 including the control devices for residence 24 are shown, according to an exemplary embodiment. System 200 is shown to include thermostat 22, indoor unit 28, outdoor unit 30, network 212, and remote server 214. Thermostat 22, indoor unit 28, and outdoor unit 30 are described with further reference to FIG. 1 and elsewhere herein.

Thermostat 22 may be any controller and/or device that can be configured to generate control signals to cause indoor unit 28 and/or outdoor unit 30 to heat, cool, and/or control the humidity of residence 24. In this regard, thermostat 22 may be communicable coupled to indoor unit 28 and/or outdoor unit 30. In various embodiments, thermostat 22 is connected to indoor unit 28 and/or outdoor unit 30 via RS-485, RS-232, WI-FI, and/or any other network or communication method. In various embodiments, indoor unit 28 and outdoor unit 30 are daisy chained via RS-485 to thermostat 22. In further embodiments, indoor unit 28 and outdoor unit 30 are connected via an RS-485 star topology.

In addition to generating control signals for indoor unit 28 and outdoor unit 30 (e.g., indoor control signals and outdoor control signals), thermostat 22 can be configured to collect operating data from indoor unit 28 and/or outdoor unit 30. In various embodiments, the connected data is a superheat value, a subcool value, a suction pressure, a suction temperature, a discharge temperature, a discharge temperature, an outdoor ambient temperature value (OAT), compressor speed (i.e., RPM), outdoor electronic expansion valve step value, fault data, and/or any other measured, calculated, and/or generated data.

Thermostat 22 can include a wireless module and/or any other network connection module and/or circuitry. In some embodiments, the wireless module and/or network connection module connects thermostat 22 to network 212. In this regard network 212 may be any kind of network or combinations of networks including, but not limited to, Wi-Fi, Wired Ethernet, a MAN network, a LAN network, a WAN network, the Internet, LTE, 3G, 2G, etc. Network 212 may include various network switches, routers, connectors, and/or any other hardware system or component necessary for implementing network 212.

Thermostat 22 may be configured to communicate the collected data from indoor unit 28 and/or outdoor unit 30 to remote server 214 via network 212. In various embodiments, remote server 214 is any kind of network server including one or more processors and/or storage mediums (e.g., databases, memory, hard drives, etc.). Further, remote server 214 can be configured to send commands and to thermostat 22 via network 212. In various embodiments, the commands are operational commands causing the system to operate according to various system settings (e.g., a specific setpoint temperature, a specific superheat setpoint, etc.). Remote server 214 may cause thermostat 22 to collect data. For example, remote server 214 may send a command to thermostat 22 to record an outdoor air temperature once every minute and send the recorded values to remote server 214. In various embodiments, remote server 214 can be configured to send data to thermostat 22 via network 212. The data may be a software update, an operating schedule, and/or any other data.

Figure 3:
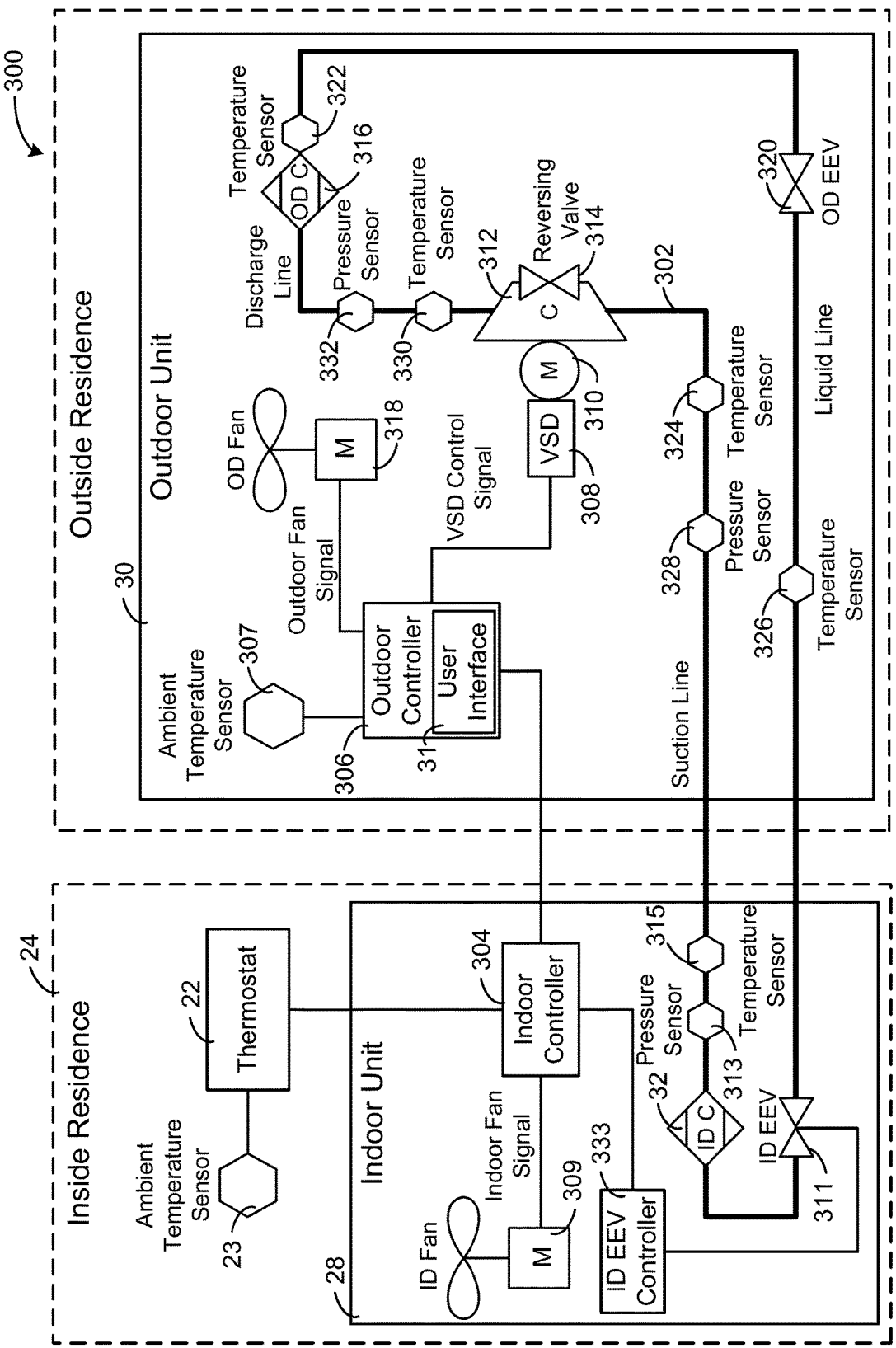
FIG. 3 is a schematic drawing of an indoor unit, an outdoor unit, and a refrigeration line of the heating and cooling system of FIG. 1, according to an exemplary embodiment.

Referring now to FIG. 3, a block diagram of system 300 including the control devices for residence 24 are shown, according to an exemplary embodiment. System 200 is shown to include thermostat 22, indoor unit 28, outdoor unit 30, network 212, and remote server 214. Thermostat 22, indoor unit 28, and outdoor unit 30 are described with further reference to FIG. 1 and elsewhere herein.

Thermostat 22 may be any controller and/or device that can be configured to generate control signals to cause indoor unit 28 and/or outdoor unit 30 to heat, cool, and/or control the humidity of residence 24. In this regard, thermostat 22 may be communicable coupled to indoor unit 28 and/or outdoor unit 30. In various embodiments, thermostat 22 is connected to indoor unit 28 and/or outdoor unit 30 via RS-485, RS-232, WI-FI, and/or any other network or communication method. In various embodiments, indoor unit 28 and outdoor unit 30 are daisy chained via RS-485 to thermostat 22. In further embodiments, indoor unit 28 and outdoor unit 30 are connected via an RS-485 star topology.

In addition to generating control signals for indoor unit 28 and outdoor unit 30 (e.g., indoor control signals and outdoor control signals), thermostat 22 can be configured to collect operating data from indoor unit 28 and/or outdoor unit 30. In various embodiments, the collected data is a superheat value, a subcool value, a suction pressure, a suction temperature, a discharge temperature, a discharge temperature, an outdoor ambient temperature value (OAT), compressor speed (i.e., RPM), outdoor electronic expansion valve step value, fault data, and/or any other measured, calculated, and/or generated data. In some embodiments, outdoor unit 30 can be configured to display the collected data on user interface 31.

Thermostat 22 can include a wireless module and/or any other network connection module and/or circuitry. In some embodiments, the wireless module and/or network connection module connects thermostat 22 to network 212. In this regard network 212 may be any kind of network or combinations of networks including, but not limited to, Wi-Fi, Wired Ethernet, a MAN network, a LAN network, a WAN network, the Internet, LTE, 3G, 2G, etc. Network 212 may include various network switches, routers, connectors, and/or any other hardware system or component necessary for implementing network 212.

Thermostat 22 may be configured to communicate the collected data from indoor unit 28 and/or outdoor unit 30 to remote server 214 via network 212. In various embodiments, remote server 214 is any kind of network server including one or more processors and/or storage mediums (e.g., databases, memory, hard drives, etc.). Further, remote server 214 can be configured to send commands and to thermostat 22 via network 212. In various embodiments, the commands are operational commands causing the system to operate according to various system settings (e.g., a specific setpoint temperature, a specific superheat setpoint, etc.). Remote server 214 may cause thermostat 22 to collect data. For example, remote server 214 may send a command to thermostat 22 to record an outdoor air temperature once every minute and send the recorded values to remote server 214. In various embodiments, remote server 214 can be configured to send data to thermostat 22 via network 212. The data may be a software update, an operating schedule, and/or any other data. In some embodiments, outdoor unit 30 and/or indoor unit 28 can send the collected data directly to remote server 214 without thermostat 22.

Referring now to FIG. 3, an HVAC system 300 is shown according to an exemplary embodiment. Various components of system 300 are located inside residence 24 while other components are located outside residence 24. Outdoor unit 30, as described with reference to FIG. 1-2, is shown to be located outside residence 24 while indoor unit 28 and thermostat 22, as described with reference to FIG. 1-2, are shown to be located inside the building.

Thermostat 22 can be configured to generate control signals for indoor unit 28 and/or outdoor unit 30. Thermostat 22 is shown to be connected to ambient temperature sensor 23 while outdoor controller 306 is shown to be connected to ambient temperature sensor 307. Ambient temperature sensor 23 and ambient temperature sensor 307 are any kind of temperature sensor (e.g., thermistor, thermocouple, etc.). Thermostat 22 may measure the temperature of residence 24 via ambient temperature sensor 23. Further, thermostat 22 can be configured to receive the temperature outside residence 24 via communication with outdoor controller 306. In various embodiments, thermostat 22 generates control signals for indoor unit 28 and outdoor unit 30 based on the indoor temperature (e.g., measured via ambient temperature sensor 23), the outdoor temperature (e.g., measured via ambient temperature sensor 307), and/or a temperature setpoint.

In various embodiments, thermostat 22 can cause indoor unit 28 and outdoor unit 30 to heat residence 24. In some embodiments, thermostat 22 can cause indoor unit 28 and outdoor unit 30 to cool residence 24. Further, thermostat 22 and/or outdoor controller 306 can be configured to initiate and perform a defrost cycle when system 300 is operating in a heating mode. When the outdoor temperature approaches freezing, moisture in the outside air that is directed over outdoor coil 316 may condense and freeze on the coil. Sensors may be included within outdoor unit 30 to measure the outside air temperature and the temperature of outside coil 316 (e.g., temperature sensor 322). These sensors provide the temperature information to the outdoor controller 306 which determines when to initiate a defrost cycle.

Indoor unit 28 and outdoor unit 30 may be electrically connected as described with reference to FIG. 2. Further, indoor unit 28 and outdoor unit 30 may be coupled via conduits 302. Outdoor unit 30 can be configured to compress refrigerant inside conduits 302 to either heat or cool the building based on the operating mode of the indoor unit 28 and the outdoor unit 30 (e.g., heat pump operation or air conditioning operation). The refrigerant inside conduits 302 may be any fluid that absorbs and extracts heat. For example, the refrigerant may be hydro fluorocarbon (HFC) based R-410A, R-407C, and/or R-134a.

Outdoor unit 30 is shown to include outdoor controller 306, variable speed drive 308, motor 310 and compressor 312. Outdoor unit 30 can be configured to control compressor 312 and cause compressor 312 to compress the refrigerant inside conduits 302. In this regard, the compressor may be driven by variable speed drive 308 and motor 310. For example, outdoor controller 306 can generate control signals for variable speed drive 308. Variable speed drive 308 (e.g., an inverter, a variable frequency drive, etc.) may be an AC-AC inverter, a DC-AC inverter, and/or any other type of inverter. Variable speed drive 308 can be configured to vary the torque and/or speed of motor 310 which in turn drives the speed and/or torque of compressor 312. Compressor 312 may be any suitable compressor such as a screw compressor, a reciprocating compressor, a rotary compressor, a swing link compressor, a scroll compressor, or a turbine compressor, etc.

In some embodiments, outdoor controller 306 can control reversing valve 314 to operate system 300 as a heat pump or an air conditioner. For example, outdoor controller 306 may cause reversing valve 314 to direct compressed refrigerant to the indoor coil 32 while in heat pump mode and to the outdoor coil 316 while in air conditioner mode. In this regard, indoor coil 32 and outdoor coil 316 can both act as condensers and evaporators depending on the operating mode (i.e., heat pump or air conditioner) of system 300.

Further, in various embodiments, outdoor controller 306 can be configured to control and/or receive data from outdoor electronic expansion valve 320. Outdoor electronic expansion valve 320 may be an expansion valve controlled by a stepper motor. In this regard, outdoor controller 306 can be configured to generate a step signal (e.g., a PWM signal) for the outdoor electronic expansion valve 320. Based on the step signal, outdoor electronic expansion valve 320 can be held fully open, fully closed, partial open, etc. In various embodiments, the outdoor controller 306 can be configured to generate step signal for the outdoor electronic expansion valve 320 based on a subcool and/or superheat value calculated from various temperatures and pressures measured in system 300.

Outdoor controller 306 can be configured to control and/or power outdoor fan 318. Outdoor fan 318 can be configured to blow air over outdoor coil 316. In this regard, outdoor controller 306 can control the amount of air blowing over the outdoor coil 316 by generating control signals to control the speed and/or torque of outdoor fan 318. In some embodiments, the control signals are pulse wave modulated signals (PWM), analog voltage signals (i.e., varying the amplitude of a DC or AC signal), and/or any other type of signal.

Outdoor unit 30 may include one or more temperature sensors and one or more pressure sensors. The temperature sensors and pressure sensors may be electrical connected (i.e., via wires, via wireless communication, etc.) to outdoor controller 306. In this regard, outdoor controller 306 can be configured to measure and store the temperatures and pressures of the refrigerant at various locations of conduits 302. The pressure sensors may be any kind of transducer that can be configured to sense the pressure of the refrigerant in conduits 302. Outdoor unit 30 is shown to include pressure sensor 328. Pressure sensor 328 may measure the pressure of the refrigerant in conduit 302 in the suction line (i.e., a predefined distance from the inlet of compressor 312. Further, outdoor unit 30 is shown to include pressure sensor 332. Pressure sensor 332 may be configured to measure the pressure of the refrigerant in conduits 302 on the discharge line (e.g., a predefined distance from the outlet of compressor 312).

The temperature sensors of outdoor unit 30 may include thermistors, thermocouples, and/or any other temperature sensing device. Outdoor unit 30 is shown to include temperature sensor 322, temperature sensor 324, temperature sensor 326, and temperature sensor 330. The temperature sensors (i.e., temperature sensor 322, temperature sensor 324, temperature sensor 326, and/or temperature sensor 330) can be configured to measure the temperature of the refrigerant at various locations inside conduits 302. Temperature sensor 322 can be configured to measure the temperature of the refrigerant inside, at the inlet to, and/or at the outlet of outdoor coil 316. Temperature sensor 324 can be configured to measure the temperature of the refrigerant inside the suction line (i.e., a predefined distance from the inlet of compressor 312. Temperature sensor 326 can be configured to measure the temperature of the liquid line (i.e., a predefined distance from the outlet of the outdoor coil 316). Further, temperature sensor 330 can be configured to measure the temperature of the discharge line (i.e., a predefined distance from the outlet of the compressor and/or a predefined distance from the inlet of the outdoor coil 316).

Referring now to indoor unit 28, indoor unit 28 is shown to include indoor controller 304, indoor electronic expansion valve controller 333, indoor fan 309, indoor coil 32, indoor electronic expansion valve 311, pressure sensor 313, and temperature sensor 315. Indoor controller 304 can be configured to generate control signals for indoor electronic expansion valve controller 333. The signals may be setpoints (e.g., temperature setpoint, pressure setpoint, superheat setpoint, subcool setpoint, step value setpoint, etc.). In this regard, indoor electronic expansion valve controller 333 can be configured to generate control signals for indoor electronic expansion valve 311. In various embodiments, indoor electronic expansion valve 311 may be the same type of valve as outdoor electronic expansion valve 320. In this regard, indoor electronic expansion valve controller 333 can be configured to generate a step control signal (e.g., a PWM wave) for controlling the stepper motor of indoor electronic expansion valve 311. In this regard, indoor electronic expansion valve controller 333 can be configured to fully open, fully close, or partially close electronic expansion valve based on the step signal.

Indoor controller 304 can be configured to control indoor fan 309. Indoor fan 309 can be configured to blow air over indoor coil 32. In this regard, indoor controller 304 can control the amount of air blowing over the indoor coil 32 by generating control signals to control the speed and/or torque of outdoor fan 318. In some embodiments, the control signals are pulse wave modulated signals (PWM), analog voltage signals (i.e., varying the amplitude of a DC or AC signal), and/or any other type of signal.

Indoor controller 304 may be electrically connected (e.g., wired connection, wireless connection, etc.) to pressure sensor 313 and/or temperature sensor 315. In this regard, indoor controller 304 can take pressure and/or temperature sensing measurements via pressure sensor 313 and/or temperature sensor 315. Pressure sensor 313 may be located on the suction line (i.e., a predefined distance from indoor coil 32) while temperature sensor 315 may be located on the liquid line a predefined distance from the inlet of indoor coil 32 and/or on the suction line a predefined distance from the outlet of indoor coil 32.

Figure 4:
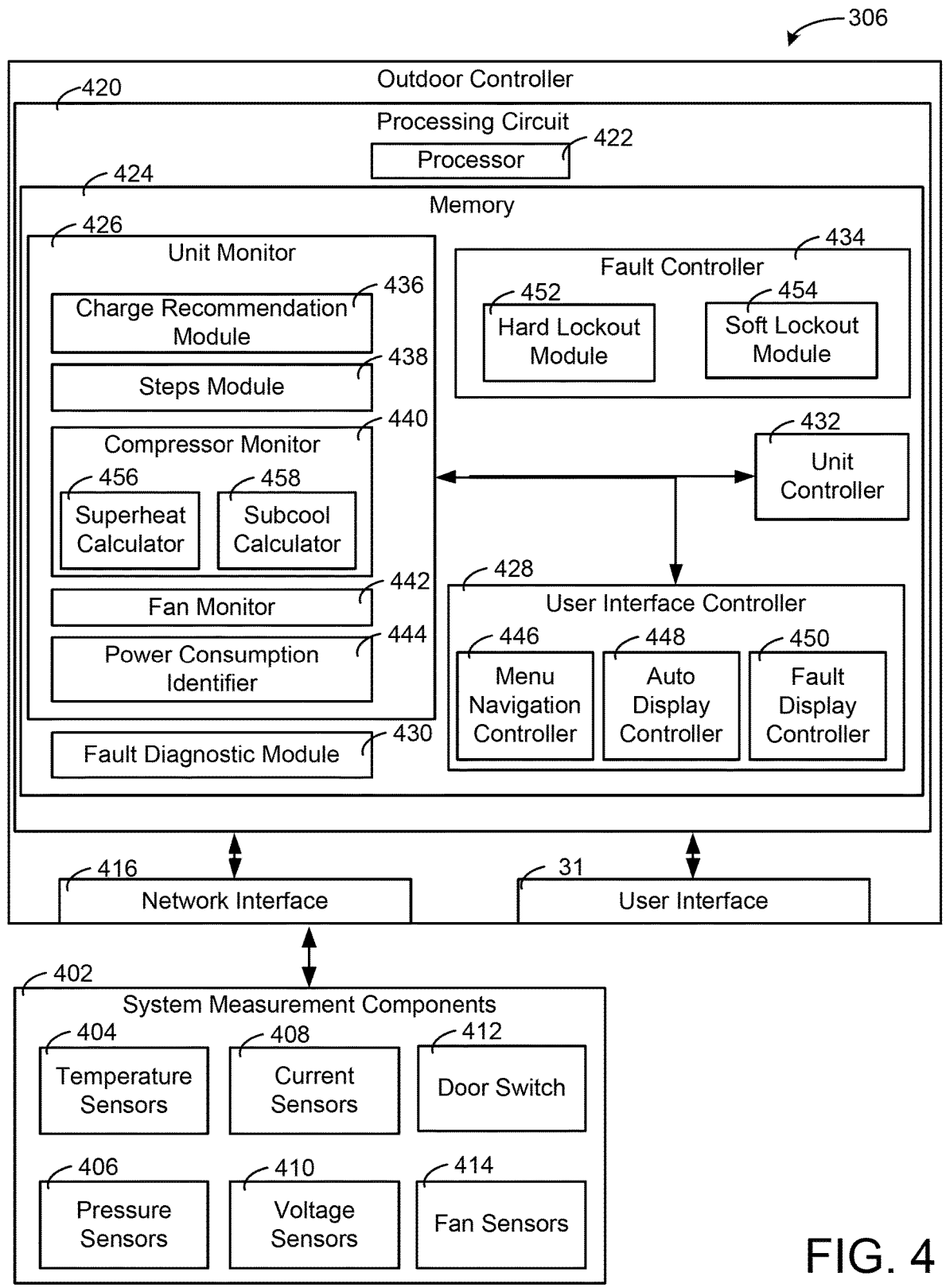
FIG. 4 is a block diagram of the outdoor controller of the outdoor unit of FIGS. 2-3, according to an exemplary embodiment.

Referring now to FIG. 4, outdoor controller 306 is shown in greater detail, according to an exemplary embodiment. Outdoor controller 306 is shown to include processing circuit 420. Processing circuit 420 may be configured to control outdoor unit 30 to heat and/or cool residence 24 to a temperature setpoint. In various embodiments, the temperature setpoint and/or control signals for the temperature setpoint are received from thermostat 22 via network interface 416.

Outdoor controller 306 is shown to communicate with system measurement components 402. In this regard, outdoor controller 306 may receive information (e.g., sensor readings) from the various system measurement components 402. System measurement components 402 include any or all of the various sensing elements of system 300 as described with reference to FIG. 3. System measurement components 402 are shown to include temperature sensors 404, pressure sensors 406, current sensors 408, voltage sensors 410, door switch 412, and fan sensors 414.

Network interface 416 is configured to communicate with network 212. Network interface 416 may allow outdoor unit 30 to communicate with a network (e.g., network 212), with indoor unit 28, with thermostat 22, and/or remote server 214. In some embodiments, network interface 416 includes components, radios, connectors, and/or any other component necessary to communicate over a wireless network (e.g., a Wi-Fi network, a Zigbee network, and/or a Bluetooth network). Network interface 416 may be able to facilitate communication over a local area network or a wide area network (e.g., the Internet, a building WAN, etc.). In some embodiments, network interface 416 may allow for communication over a wired means and may use a variety of communications protocols (e.g., N2, BACnet, IP, LON, RS-485, RS-232, Ethernet, etc.). Network interface 416 may include any component necessary for communicating over any kind of network.

User interface 31 may be any kind of screen and/or touch screen. User interface 31 may be configured to present information to a user and receive commands from the user. In some embodiments, user interface 31 is a resistive touch screen, a capacitive touch screen (e.g., a single-touch touch screen and/or a multi-touch touch screen) and/or any other kind of touch screen. In some embodiments, user interface 31 is a seven segment display. User interface 31 may be and/or include a color display and/or a solid color display (e.g., black and white, blue and white, etc.). In various embodiments, a user may navigate a menu via user interface 31. In various embodiments, user interface 31 includes buttons, switches, and/or any other component that can be used to navigate the menu.

Temperature sensors 404 may be any kind of temperature sensor. In some embodiments, temperature sensors 404 may be positioned and/or configured to measure the temperature of the liquid line (e.g., temperature sensor 326), the suction line (e.g., temperature sensor 324), the discharge line (e.g., temperature sensor 330), a coil (e.g., temperature sensor 322) and/or any other component and/or line system 300 as described with reference to FIG. 3. In some embodiments, temperature sensors 404 are thermocouples (e.g., nickel-alloy thermocouples, platinum/rhodium-alloy thermocouples, tungsten/rhenium-alloy thermocouples, etc.) In some embodiments, temperature sensors 404 are thermistors, resistance thermometers, silicon bandgap temperature sensors, and/or any other kind of temperature sensor.

Pressure sensors 406 may be any kind and number of pressure sensors. Pressure sensors 406 may be used to measure the pressure in the liquid line, the pressure of the discharge line (e.g., pressure sensor 332), the pressure of the suction line (e.g., temperature sensor 324), the pressure of refrigerant in a coil (e.g., outdoor coil 316), and/or any other pressure. In some embodiments, pressure sensors 406 are piezo-resistive gauges, capacitive pressure sensors, an electromagnetic pressure sensors, piezoelectric pressure sensors, potentiometric pressure sensors and/or any other kind of sensor that can be used to measure pressure. In some embodiments, pressure sensors 406 are connected to the liquid line, the suction line, the discharge line, a coil, and/or any other line and/or component through a shcrader fitting (i.e., valve) and/or any other connector.

Current sensors 408 may be configured to measure current sourced by variable speed drive 308, motor 310, and/or any other component. In various embodiments, current sensors 408 may be used to measure the amount of current sourced by outdoor unit 30. In some embodiments, current sensors 408 are current clamps. In various embodiments, current sensors 408 are voltage sensors measuring voltages over shunt resistors. Current sensors 408 may be any kind of current sensor. In various embodiments, current sensors 408 may be configured to measure the current sourced by a fan (e.g., outdoor fan 318, indoor fan 309, etc.).

Outdoor unit 30 is shown to include voltage sensors 410. In some embodiments, voltage sensor 410 are analog inputs of processing circuit 420 measuring a resistance proportional and/or otherwise a function of voltage. In some embodiments, voltage sensors 410 are volt meters and/or any other kind of voltage sensor. In some embodiments, voltage sensors 410 are configured to measure AC and/or DC voltage. In various embodiments, voltage sensors 410 are configured to measure an input and/or output voltage of variable speed drive 308 and/or motor 310. Voltage sensors 410 may be configured to measure a supply voltage of a fan (e.g., outdoor fan 318 and/or indoor fan 309). In various embodiments, voltage sensors 410 measure a pulse wave modulated signal used to control one of the fans. Voltage sensors 410 may be configured to measure any other voltage associated with outdoor unit 30. Voltage sensors 410 in combination with current sensors 408 can be configured to measure the amount of power consumed (e.g., power sourced) by various components of outdoor unit 30 (e.g., variable speed drive 308, motor 310, outdoor fan 318, indoor fan 309, etc.).

Outdoor controller 306 is shown to include door switch 412. In various embodiments, outdoor unit 30 includes an enclosure with a door covering various components (e.g., outdoor controller 306, user interface 31, etc.). In some embodiments, door switch 412 is configured to determine if the door is open and/or closed. In some embodiments, door switch 412 is configured to cause user interface controller 428 to turn user interface 31 off when the door is closed. When the door is opened, as determined by door switch 412, user interface controller 428 is configured to turn user interface 31 on. In various embodiments, door switch 412 is any kind of electrical contact and/or push button. In some embodiments, when door switch 412 indicates that the door has just been opened, user interface controller 428 is configured to operate in a default mode (e.g., show a default screen). In some embodiments, when the door is closed, user interface controller 428 is configured to deactivate (i.e., turn off) user interface 31.

Fan sensors 414 may be configured to measure the speed of any fans and/or the air flow generated by the fans (e.g., outdoor fan 318 and/or indoor fan 309). In some embodiments, fan sensor 414 are flow sensors and/or voltage and/or current sensors (e.g., current sensor 408, voltage sensor 410). In some embodiments, fan sensors 414 are configured to measure the current sourced by the fan, the voltage applied to the fan, a PWM voltage wave applied to the fan, and/or any other wave, signal, and/or value proportional and/or otherwise a function of the fan speed, air velocity of the fan, volume flow of the fan, etc. In some embodiments, fan sensors 414 are any kind of mechanical and/or electro-mechanical flow meter for measuring air flow. In some embodiments, fan sensors 414 includes multiple high frequency transducers. In some embodiments, the fan sensors 414 is a tachometer, an encoder, and/or any other device that can be used to measure values proportional and/or otherwise a function of speed (i.e., rotational speed).

Processing circuit 420 is shown to include processor 422 and memory 424. Processor 422 may be general purpose or specific purpose processors, an application specific integrated circuits (ASICs), one or more field programmable gate arrays (FPGAs), a group of processing components, or other suitable processing components. The processor can be configured to execute computer code or instructions stored in memory or received from other computer readable media (e.g., CDROM, network storage, a remote server, etc.).

Memory 424 can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. Memory 424 is shown to include unit monitor 426, user interface controller 428, fault diagnostic module 430, unit controller 432, and fault controller 434. These elements may be a single module, multiple modules, and may be combined in any manner.

Unit monitor 426 is configured to monitor various operating parameters of outdoor unit 30 and/or system 300. Unit monitor is shown to include one or more modules for monitoring the various operating parameters. Unit monitor 426 is shown to include charge recommendation module 436, steps module 438, compressor monitor 440, fan monitor 442, and power consumption identifier 444.

Charge recommendation module 436 can be configured to generate a recommendation for adding and/or removing charge. In some embodiments, charge recommendation module 436 may be configure to monitor a superheat value calculated by superheat calculator 456, a subcool value calculated by subcool calculator 458, a suction line pressure, a suction line temperature, a liquid line temperature, a discharge line pressure, and/or a discharge line temperature determined by temperature sensors 404 and/or pressure sensors 406.

In various embodiments, charge recommendation module 436 can cause user interface controller 428 to display a recommendation for adding and/or removing charge on user interface 31. In various embodiments, the suggestion is a range of values. For example, the value may be "+3%" and/or "−3%." In some embodiments, the suggestion is based on unit size (e.g., tonnage). The value may denote if charge needs to be added and/or removed from outdoor unit 30 and may denote an approximate amount to add and/or remove. A technician may be able to enter via user interface 31 that they have added and/or removed charge. In response to the technician indicating that the change has changed, charge recommendation module 436 can be configured to recalculate the charge recommendation. Charge recommendation module 436 can be configured to then recommend to the technician, via user interface 31, that they add charge, remove charge, or if they have the correct charge.

Steps module 438 can configured to receive a step value for an electronic expansion valve (e.g., outdoor electronic expansion valve 320 and/or indoor electronic expansion valve 311) from unit controller 432. In some embodiments, steps module 438 is configured to cause user interface controller 428 to display the step value on user interface 31. The steps received from unit controller 432 may be the current step value for a stepper motor of an electronic expansion valve. In this regard, unit controller 432 may control the stepper motor and generate a certain number of steps for the stepper motor. In this regard, steps module 438 can communicate with unit controller 432 to determine what the current step value being commanded by unit controller 432 is. In various embodiments, steps module 438 can determine the step value for outdoor electronic expansion valve 320 and/or indoor electronic expansion valve 311. In some embodiments, outdoor controller 306 communicates with thermostat 22, indoor controller 304, and/or indoor electronic expansion valve controller 333 to determine the current step value of indoor electronic expansion valve 311.

Compressor monitor 440 can be configured to determine the status of compressor 312, variable speed drive 308, and/or motor 310. Compressor monitor 440 is shown to include subcool calculator 458 and superheat calculator 456. Subcool calculator 458 may be configured to determine a subcool value for system 300 while superheat calculator 456 can be configured to determine a superheat value for system 300. In some embodiments, compressor monitor 440 stores the type of coolant used by outdoor unit 30. In some embodiments, a technician can select a type of refrigerant to be used in superheat calculator 456 and/or subcool calculator 458 via user interface 31. In various embodiments, subcool calculator 458 and/or superheat calculator 456 stores a look up table that identifies refrigerant temperatures associated with various refrigerant pressures and/or one or more equations that subcool calculator 458 and/or superheat calculator 456 can use to determine a temperature associated with various pressures. In some embodiments, subcool calculator 458 may be configured to measure the pressure of the discharge line via pressure sensors 406 (e.g., pressure sensor 332) and a temperature of the liquid line via temperature sensors 404 (e.g., temperature sensor 326). Using an equation and/or a table, the subcool calculator 458 can be configured to determine a subcool value based on the liquid line temperature and the discharge line pressure. Superheat calculator 456 can be configured to measure the pressure of the discharge line via pressure sensors 406 (e.g., pressure sensor 332) and the temperature of the discharge line via temperature sensors 404 (e.g., temperature sensor 330). Based on the pressure of the discharge line and the temperature of the discharge line, superheat calculator 456 can be configured to determine a superheat value (e.g., via equations, lookup tables, etc.).

Fan monitor 442 can be configured to determine the speed of various fans of system 300 (e.g., outdoor fan 318 and/or indoor fan 309) based on the values measured by fan sensors 414. In some embodiments, the fan monitor 442 determines fan speeds based on values from a tachometer, encoder, a voltage sensor, a current sensor, a flow meter, and/or any other sensor and/or device and/or sensor. Fan monitor 442 may determine the speed (i.e., rotational speed) and/or air flow produced by the fan. In some embodiments, fan speeds and/or air flow is determined (e.g., calculated) based on control signals received from a device (e.g., thermostat 404) and/or control signals generated by unit controller 432.

Power consumption identifier 444 may be configured to determine the amount of power sourced (e.g., consumed) by components of system 300 via voltage sensors 410 and/or current sensors 408. In some embodiments, power consumption identifier 444 receives current measurements and voltage measurements from the input side of variable speed drive 308 and/or motor 310. In some embodiments, power consumption identifier 444 uses current and voltage measurements taken by current sensor 408 and voltage sensor 410 to determine the amount of power sourced by variable speed drive 308 and/or motor 310.

In some embodiments, fault diagnostic module 430 includes non-volatile memory. In some embodiments, non-volatile memory includes at least one of ROM, VNRAM, and/or non-volatile mechanical and/or electrical data storage. In some embodiments, fault diagnostic module 430 is configured to record system status data in the non-volatile memory in the event that a system fault is determined. In some embodiments, fault diagnostic module 430 builds a system fault profile by storing system status variables in non-volatile memory every time a fault is detected. In some embodiments, the system status variables include variables measured and/or determined by outdoor controller 306. The values measured and/or determined by outdoor unit 30 may be liquid line pressure, liquid line temperature, suction line pressure, suction line temperature, variable speed drive input current, variable speed inverter voltage, discharge line pressure, discharge line temperature, coil pressure, coil temperature, actual compressor speed, compressor target speed, fan speed, airflow, electronic expansion valve position, run time, compressor run time, heating or cooling mode, defrost state, electronic expansion valve target position, actual electronic expansion valve position, indoor temperature, outdoor temperature, indoor humidity, outdoor humidity etc. The various system variables may be computed by outdoor controller 306, measured by outdoor controller 306 via various temperature and pressure sensors (e.g., pressure sensors 406, temperature sensors 404) and/or received from thermostat 22. The system data may also be transmitted to thermostat 22 and/or remote server 214. A user and/or technician may be able to view the various system variables associated with the fault via user interface 31. Further, a user and/or technician may be able to view the various system variables associated with a plurality of faults by date and time. Fault diagnostic module 430 may include a log of all faults that a dealer can access via user interface 31.

In some embodiments, fault diagnostic module 430 records system status data and thermostat data repeatedly every time a predefined amount of time has elapsed. In various embodiments, the thermostat data may be indoor temperature, outdoor temperature, etc. Every time fault diagnostic module 430 stores data, the data may include a time stamp to denote when the data was recorded. In some embodiments, fault diagnostic module 430 is configured to push all fault diagnostic information and/or system status data to remote server 214 via network interface 416. In some embodiments, fault diagnostic module identifies a value (e.g., superheat, subcool, compressor speed, liquid line pressure, etc.) that has been affected by the system fault (e.g., is above a predefined amount or is below a predefined amount). In some embodiments, the affected system fault is sent to fault display controller 450 to be displayed on user interface 31.

User interface controller 428 may be configured to generate images, number symbols, letter symbols, text, and/or any other display information for user interface 31. In some embodiments, user interface controller 428 may be configured to receive input from user interface 31. In some embodiments, user interface controller 428 receives a signal from door switch 412. In some embodiments, door switch 412 may be configured to determine if an access door of outdoor unit 30 has been opened and/or closed. User interface 31 can be configured to turn user interface 31 off when the door is closed, as determined by door switch 412. When the door is opened, as determined by door switch 412, user interface controller 428 can be configured to turn user interface 31 on. In this regard, opening and closing the door can activate and/or deactivate door switch 412 respectively.

User interface controller 428 is shown to include menu navigation controller 446, auto display controller 448, and fault display controller 450. Menu navigation controller 446 may be configured to allow a user and/or technician to navigate through a user menu by pressing a screen and/or buttons of user interface 31. In some embodiments, menu navigation controller 446 may allow a user to cause unit controller 432 to generate control commands for outdoor controller 306 (e.g., unit controller 432). In various embodiments, when a user navigates through a menu controlled by menu navigation controller 446, menu navigation controller 446 will return user interface 31 to a home screen and/or default screen if the user does not interface with user interface 31 for a predefined amount of time.

In some embodiments, menu navigation controller 446 may allow a user to put outdoor unit 30 in a test mode via user interface 31. In some embodiments, menu navigation controller will send a test mode signal to unit controller 432 based on input received via user interface 31. In some embodiments, menu navigation controller 446 will allow user to view fault statuses of outdoor unit 30 when a user requests the faults be displayed through user interface 31. In some embodiments, the faults are received from fault controller 434.

In some embodiments, menu navigation controller 446 may allow a user to clear and/or otherwise override a fault. In some embodiments, when a user clears and/or overrides a fault, menu navigation controller 446 may send a signal to fault controller 434 to clear and/or override the fault. In some embodiments, menu navigation controller 446 may receive a command from user interface 31. In some embodiments, the command may be to operate in a DOE-AHRI mode. In some embodiments, menu navigation controller 446 may send the command to unit controller 432. In some embodiments, menu navigation controller 446 may receive a demand response configuration command from user interface 31. In some embodiments, menu navigation controller 446 sends a demand response signal to unit controller 432. In some embodiments, menu navigation controller 446 may be configured to receive a notification that variable speed drive 308 has been replaced in outdoor unit 30 via user interface 31. In some embodiments, menu navigation controller 446 may send a notification to unit controller 432 to load predefined settings (i.e., default operational settings, install settings, etc.), previously saved settings, etc. for unit controller 432 to operating the new variable speed drive.

In some embodiments, menu navigation controller 446 may be configured to receive commands for instantiating and/or connecting soft jumpers on outdoor unit 30 via user interface 31. In some embodiments, menu navigation controller 446 may be configured to send the soft jumper commands to unit controller 432. In various embodiments, soft jumpers and/or input via user interface controller 428 may allow the residential unit to operating in a defrost-terminate temperature mode, a comfort-efficiency mode, an advanced dehumidification mode, an auxiliary heat lockout mode, a heat pump lockout mode, and/or any other mode. Various soft jumper commands and/or configurations can be selected via user interface 31. The soft jumpers may be commanded to bypass control signals generated by thermostat 22 and/or operate outdoor unit 30 in a forced operating mode (e.g., forced start). Soft jumpers may be switches and/or electrical components controlled by unit controller 432. In various embodiments, soft jumpers are operating modes of unit controller 432. Soft jumpers may be settings that are conventionally manually set using a physical jumper wire.

In some embodiments, menu navigation controller 446 may allow a user to view a recommendation for adding and/or removing charge from outdoor unit 30 as determined by charge recommendation module 436. Menu navigation controller 446 may allow a user to enter certain operating parameters via user interface 31. For example, a user may enter a compressor speed via user interface 31. Menu navigation controller 446 can cause unit controller 432 to operate at the entered compressor speed. Further, a user can enter an outdoor fan speed (e.g., for outdoor fan 318), an indoor fan speed (e.g., for indoor fan 309), and indoor flow value (e.g., flowrate for indoor fan 309), an electronic expansion valve position (e.g., setpoint for outdoor electronic expansion valve 320 and/or indoor electronic expansion valve 311) and/or any other value which a user may want to manually set.

In some embodiments, menu navigation controller 446 may allow a user to view current operating parameters and/or target (e.g., commanded) operating parameters via user interface 31. The target operating parameters may be a commanded compressor speed, a commanded outdoor fan speed, a commanded indoor fan air flow, a commanded expansion valve position, and/or any other commanded value. The menu navigation controller 446 may also allow a user to view, via user interface 31, the actual compressor speed, the actually outdoor fan speed, the actually expansion valve position, the input voltage outdoor unit 30 (i.e., the inverter), the input current of variable speed drive 308, and/or any other value. Menu navigation controller 446 can allow a user to view the current mode configuration of outdoor controller 306. For example, a user might view the current demand response configuration of outdoor unit 30, whether outdoor unit 30 is in heating and/or cooling mode, and/or any other configuration and/or operating mode.

In some embodiments, a user may be able to select a test mode via user interface 31. In some embodiments, menu navigation controller 446 may allow a user to navigate a menu and select a test mode. The test mode may allow a technician to easily trouble shoot outdoor unit 30. In various embodiments, test mode may cause outdoor unit 30 to bypass various timers and command outdoor unit 30 to operate in various states and/or modes. In some embodiments, when a user selects a test mode via user interface 31, a bypass anti-short cycle delay (ASCD) timer may be deactivated (i.e., set to zero). An ASCD timer may cause outdoor unit 30 and/or a compressor 312 of outdoor unit 30 to lockout for a predefined amount of time. In some embodiments, a technician may be able to select an operating mode for outdoor unit 30 (e.g., heating mode, cooling mode, efficiency mode, comfort mode, air-conditioning mode or heat pump mode, etc.). In some embodiments, the test mode displays the current operational mode (i.e., AC mode, HP mode, etc.) on user interface 31.

In various embodiments, the test mode may allow outdoor unit 30 to enter a defrost cycle regardless of various temperatures, pressures, and/or any other value of components of outdoor unit 30. In some embodiments, a user and/or a technician can command outdoor unit 30 to enter a defrost mode (i.e., a forced defrost mode) via user interface 31 and menu navigation controller 446. In some embodiments, initiating a defrost cycle in test mode may cause outdoor unit 30 (i.e., unit controller 432) to ignore a coil temperature, a liquid line pressure, a discharge line pressure, a suction line pressure, etc. In various embodiments, there is an absolute trip value for the coil temperature, the liquid line pressure, the discharge line pressure, the suction line pressure, etc. (e.g., for a temperature and/or pressure of system 300). If the absolute trip value is met and/or tripped (e.g., system value above upper trip value, system value below lower trip value, etc.), unit controller 432 may be configured to immediately end the defrost cycle even when in a test mode in order to prevent damage to outdoor unit 30. When a defrost cycle is initiated in test mode, the defrost cycle may remain active until the technician sends a command via user interface 31 and/or menu navigation controller 446 to end the cycle. Indicating, via user interface 31, to end a defrost cycle may immediately end a defrost cycle. Various commands and/or signals received from user interface 31 may be sent to various components of outdoor unit 30 (e.g., unit processing circuit 420).

In some embodiments, a technician and/or user may be able to change a demand response configuration for outdoor unit 30 via user interface 31 and menu navigation controller 446. In some embodiments, a user may be able to turn a demand response configuration on and/or off via user interface 31 and menu navigation controller 446. In some embodiments, a demand response configuration may change the amount of energy consumed by outdoor unit 30. In various embodiments, a demand response configuration may cause unit 30 to perform off-peak metering. Off-peak metering may cause outdoor unit 30 to consume various amount of energy at different times of the day in order to minimize energy consumption. Also, outdoor unit 30 may be configured to perform smart metering. In various embodiments, outdoor unit 30 may receive energy cost values from a plant. Based on the energy cost values, outdoor unit 30 may be configured to consume various amounts of energy and various times of the day to minimize energy consumption.

Auto display controller 448 can be configured to scroll information on user interface 31. In some embodiments, auto display controller 448 may be configured to display the subcool value, the superheat value, the liquid line pressure, the liquid line temperature, the discharge line pressure, the discharge line temperature, the suction line pressure, the suction line temperature, the steps of an electronic expansion valve (e.g., outdoor electronic expansion valve 320, the rotational speed of the compressor (e.g., motor 310, compressor 312), the rotational speed of various fans of outdoor unit 30 (e.g., outdoor fan 318 and/or indoor fan 309), the air flow created by various fans of outdoor unit 30 (e.g., outdoor fan 318 and/or indoor fan 309), the power consumed by variable speed drive 308, speed of compressor 312, faults and/or any other value. In some embodiments, the values scrolled are determined by unit monitor 426 (e.g., charge recommendation module 436, steps module 438, compressor monitor 440, superheat calculator 456, subcool calculator 458, fan monitor 442, power consumption identifier 444, etc.), fault diagnostic module 430, and/or any other component and/or element of memory 424.

Fault display controller 450 may be configured to display fault information on user interface 31 in the event of a fault. In some embodiments, fault display controller 450 is configured to receive fault information from fault diagnostic module 430 and/or fault controller 434. In some embodiments, fault display controller 450 is configured to display a scrolling message on user interface 31 identifying any variables affected by the system fault. For example, a message could be "High discharge pressure". Fault display controller 450 may be configured to cause user interface 31 to display the affected value. In this regard, fault controller 434, fault diagnostic module 430, and/or user interface controller 428 can be configured to monitor temperature sensors 404, pressure sensors 406, current sensors 408, voltage sensors 410, fan sensors 414 to determine if any component of system 300 as described with reference to FIG. 3 is experiencing a fault (e.g., a value measured by system measurement components 402 is above and/or below a predefined level)

In some embodiments, fault display controller 450 can cause a health indicator to be displayed on user interface 31. The health indicator may be at least one of a status color light (e.g., red, yellow, green) and/or a face (e.g., a smile, a frown, etc.). In some embodiments, a smiling face may indicate that no fault is present in the system. A frowning face may indicate that a fault is present in the system and/or a fault has been previously detected. A "straight face" may indicate that the system has encountered a minor fault and/or may need to be serviced.

Memory 424 is shown to include unit controller 432, and a fault controller 434. Unit controller 432 can be configured to operate outdoor unit 30 and cause outdoor unit 30 to either heat and/or cool residence 24. In this regard, unit controller 432 can be configured to generate control signals for various components of system 300. Unit controller 432 may be configured to control an electronic expansion valve of outdoor unit 30 (e.g., outdoor electronic expansion valve 320 and/or indoor electronic expansion valve 311). In some embodiments, the electronic expansion valve includes a stepper motor. In some embodiments, the electronic expansion valve changes the amount of refrigerant flowing through various components of system 300. In some embodiments, unit controller 432 uses PID loops and/or any other control algorithm to control the electronic expansion valve. In some embodiments, unit controller 432 is configured to receive a superheat value and/or a subcool value from superheat calculator 456 and/or subcool calculator 458. Based on the superheat valve and/or subcool value, unit controller 432 may be configured to determine an appropriate step value (i.e., open valve, close, valve, open a defined amount, etc.) for the stepper motor of the electronic expansion valve.

Unit controller 432 may be configured to control the behavior of outdoor unit 30. In various embodiments, unit controller 432 communicates with thermostat 22 and can cause thermostat 22 to operate outdoor unit 30 in any way. In some embodiments, unit controller 432 includes various control algorithms (e.g., PID algorithms) for controlling variable speed drive 308, motor 310, and/or compressor 312. In some embodiments, unit controller 432 is configured to receive a heating and/or cooling setpoint from thermostat 22 via network interface 416. Based on the heating and/or cooling setpoint, unit controller 432 may control the operation of outdoor unit 30 to achieve heating and/or cooling setpoints. In this regard, unit controller 432 may command a speed for variable speed drive 308, motor 310, and/or compressor 312. This speed may be communicated to user interface controller 428 to be displayed on user interface user interface 31. Further, unit controller 432 may command various fan speeds and/or flow rates for indoor fan 309 and outdoor fan 318. In this regard, unit controller 432 can communicate the commanded speed and/or air flow for the fans to user interface controller 428 to be displayed don user interface 31.

In some embodiments, unit controller 432 is configured to receive various operating modes from menu navigation controller 446 and/or user interface 31. In some embodiments, the operating mode is a demand response mode, a department of energy, a heating mode, a cooling mode, an efficiency mode, a comfort mode, an air-conditioning mode, a heat-pump mode, a heating and refrigeration institute mode (DOE-AHRI mode), and/or any other mode. In some embodiments, unit controller 432 may be configured to receive a defrost mode, a test mode, and/or any other mode. Unit controller 432 may be configured to perform various control actions and/or generate various control signals for components of outdoor unit 30 based on the mode. In some embodiments, unit controller 432 may be configured to instantiate and/or otherwise connect soft jumpers for outdoor unit 30 when a soft jumper command is received from menu navigation controller 446.

In some embodiments, unit controller 432 may receive operating mode commands from thermostat 22 via network interface 416. In various embodiments, unit controller 432 may be configured to receive operating mode commands from user interface 31 via user interface controller 428. In some embodiments, a user may be able to select a cost savings mode and/or reduced runtime mode via user interface 31. In some embodiments, the cost savings mode may cause unit controller 432 to automatically adjust a temperature setpoint received from thermostat 22 and/or send a request to thermostat 22 to prompt a user to adjust a temperature setpoint based on a BTU/hr rating of outdoor unit 30 and/or the square footage of the building and/or home that outdoor unit 30 may be heating and/or cooling. In some embodiments, a technician and/or user may enter the square footage of the building and/or home via user interface 214, in various embodiments, the square footage of the building and/or home may be received via network interface 416 from remote server 214 and/or thermostat 22.

In various embodiments, unit controller 432 may be configured to operate in an DOE-AHRI mode. In various embodiments, the mode is selected via user interface 31 through menu navigation controller 446. In some embodiments, operating in DOE-AHRI mode includes operating at predefined settings. In some embodiments, the settings are fan speeds, compressor speeds, electronic expansion valve settings, runtime and/or any other setting. In some embodiments, the settings are lab determined which meet various DOE-AHRI criteria.

Fault controller 434 may be configured to record and/or otherwise monitor fault sensors (e.g., temperature sensors 404, pressure sensors 406, fan sensors 414) of outdoor unit 30. Fault controller 434 may monitor various temperatures, pressures, power consumption, etc. of various components (discharge line, coil, etc.) of outdoor unit 30. If the values monitored by fault controller 434 are above a predefined threshold and/or below a predefined threshold, fault controller 434 may determine that outdoor unit 30 is experiencing a fault. In some embodiments, fault controller 434 may cause outdoor unit 30 to enter a soft lockout and/or a hard lockout. In some embodiments, fault controller 434 causes outdoor unit 30 to enter a soft lockout when a fault has occurred. In some embodiments, the fault is a noncritical fault. In some embodiments, soft lockout module 454 causes outdoor unit 30 to operate with limited functionality when a soft lockout is present.

In some embodiments, a hard lockout is operated by hard lockout module 452 and is a complete shutdown of outdoor unit 30 and/or causes outdoor unit 30 to pause and/or stop all operations. In some embodiments, hard lockout module 452 causes a hard lockout to be activated when a predefined number of soft faults and/or predefined number and/or type of soft faults (e.g., repeating soft faults) have occurred. In some embodiments, fault controller 434 may be configured to receive a lockout override via user interface 31 and user interface controller 428. In some embodiments, fault controller 434 may be configured to receive a soft lockout override and/or a hard lockout override from user interface controller 428. In various embodiments, a technician, via user interface 31 may be able to clear any fault logs stored by fault diagnostic module 430 and/or fault controller 434. The soft lockout override, hard lockout override, and clear fault command may require the control (e.g., thermostat 404, outdoor unit 30, etc.) to be in a standby mode.

In various embodiments, fault controller 434 may identify faults based on sensor data (e.g., discharge temperature, discharge pressure, etc.). In some embodiments, the sensor data is line pressures, speed of compressor 312. Fault controller 560 may compare sensor data to various thresholds. If the sensor data breaks a thresholds (i.e., exceeds a threshold, is below a threshold, etc.) a fault, a fault type, and/or a fault level (i.e., soft lockout, hard lockout, ignore fault, etc.) may be identified by fault controller 434.

Figure 5:
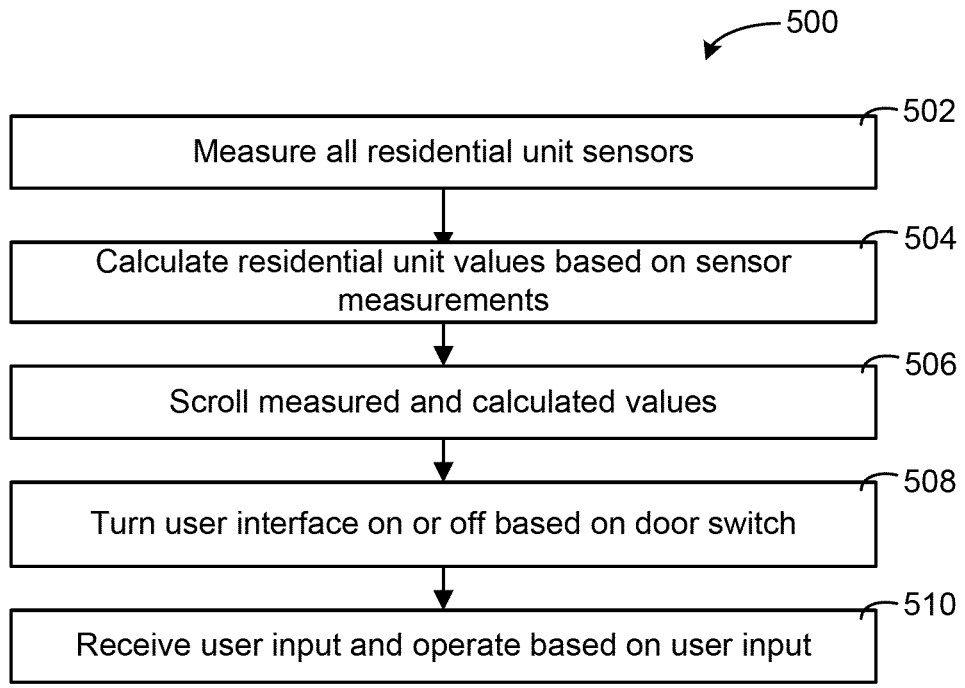
FIG. 5 is a flow diagram of a process for operating a user interface and the outdoor controller of FIG. 4, according to an exemplary embodiment.

Referring now to FIG. 5, a process 500 for operating user interface 31 of outdoor unit 30 via outdoor controller 306 is shown, according to an exemplary embodiment. In step 502, all sensors of outdoor unit 30 are measured by unit monitor 426 and/or any other module of memory 424. In various embodiments, only a portion of sensors are measured by unit monitor 426. The sensors may be temperature sensors 404 configured to measure various temperatures of outdoor unit 30 (e.g., suction line temperature, discharge line temperature, liquid line temperature, coil temperatures etc.). The sensors may also be pressure sensors 406 configured to measure various pressures of outdoor unit 30 (e.g., suction line pressure, discharge line pressure, liquid line pressure, etc.). In some embodiments, power consumption measurements are taken (e.g., voltage of input to variable speed drive 308, current input to variable speed drive 308, power consumption of indoor fan 309, power consumption of outdoor fan 318 etc.). Further, user interface controller 428 and/or unit controller 432 may be configured to determine current operating values of outdoor unit 30 (e.g., steps of stepper motor for electronic expansion valve, speed of compressor 312, flowrate of a fan, speed of a fan, etc.). Further, unit monitor 426 and/or any other component of memory 424 may be configured to measure air flow, fan speeds, compressor speeds with any kind of sensor (e.g., PWM sensor, voltage sensor, current sensor, tachometer, encoder, flow sensor, etc.)

In step 504, unit monitor 426 and/or any other component of memory 424 may be configured to take the measured sensor values and compute various values for outdoor unit 30. In some embodiments, unit monitor 426 and/or any other component of memory 424 may be configured to calculate the compressor speed, the speed and/or airflow of various fans, power consumption of an inverter for a variable speed drive, superheat, subcool, and/or any other value indicating the status and/or operating condition of outdoor unit 30. In step 506, user interface controller 428 may be configured to display the various values calculated in step 504. In some embodiments, these values may be scrolled across user interface 31 by user interface controller 428. In some embodiments, a portion of the values are scrolled across user interface 31. In some embodiments, the values and/or a portion of the values are displayed continuously on user interface 31.

In step 508, user interface controller 428 may be configured to receive input from a user (i.e., a technician) via user interface 31. In some embodiments, the user must first remove a door and/or blocking piece. When the door is removed, door switch 412 may cause user interface 31 to activate (e.g., turn on). In some embodiments, in response to the door switch 412 indicating that the door has been replaced, user interface 31 may be de-activated (i.e., turned off).

In step 510, user interface controller 428 may be configured to allow a user to navigate a menu via user interface 31. In some embodiments, the user may be able to enter various operating modes based on command received from user interface 31 (step 510). In some embodiments, the commands are to initiate a defrost cycle, to operate in certain mode (e.g., test mode, heating mode, comfort mode, etc.), to determine if charge should be added or removed, etc.

Figure 6:
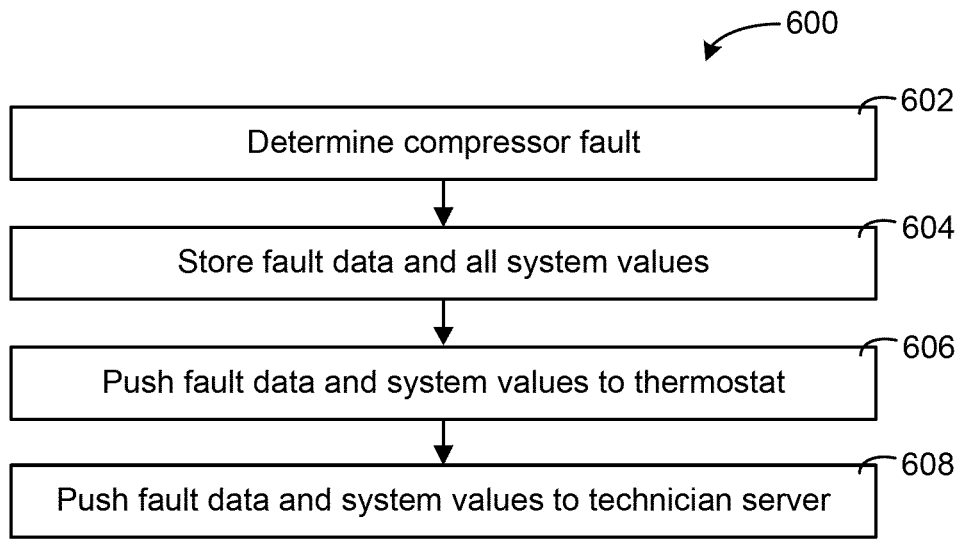
FIG. 6 is a flow diagram of a process for operating the outdoor controller of FIG. 2-4 based on determined faults, according to an exemplary embodiment.

Referring now to FIG. 6, a process 600 for recording fault data for outdoor unit 30 is shown, according to an exemplary embodiment. Process 600 may be performed by fault diagnostic module 430 and other various components of memory 424. In step 602, operating data for outdoor unit 30 is recorded periodically (e.g., every minute). In various embodiments, fault diagnostic module 430 is configured to identify faults, fault types, and/or a fault level (i.e., impact of fault on outdoor unit 30). In some embodiments, the fault data and the system data is stored locally on outdoor controller 306 (step 604) and/or is communicated to thermostat 22 and/or remote server 214 via network interface 416 (step 606). In some embodiments, the fault data is pushed to a server for Internet access (e.g., remote server 214) (step 608). The fault data may include fault code/system status history. A client (e.g., a technician, a home owner, etc.) may be able to access the server (e.g., technician server) through a web portal any time. The data may be used for equipment monitoring/installation, servicing, troubleshooting etc. Based on data analysis of the fault data stored on remote server 214, operators in a technical services department may be able to determine how critical a related issue is, and whether it requires the services of a field technician.

Trouble shooting based on data stored on remote server 214 may save time in terms of both problem analysis and issue mitigation. Information regarding compressor and evaporator suction and discharge pressures and temperatures, along with superheat and sub-cool data provide comprehensive information on the health of the system and its components and assists in developing better equipment monitoring to prevent system failure.

Figure 7:
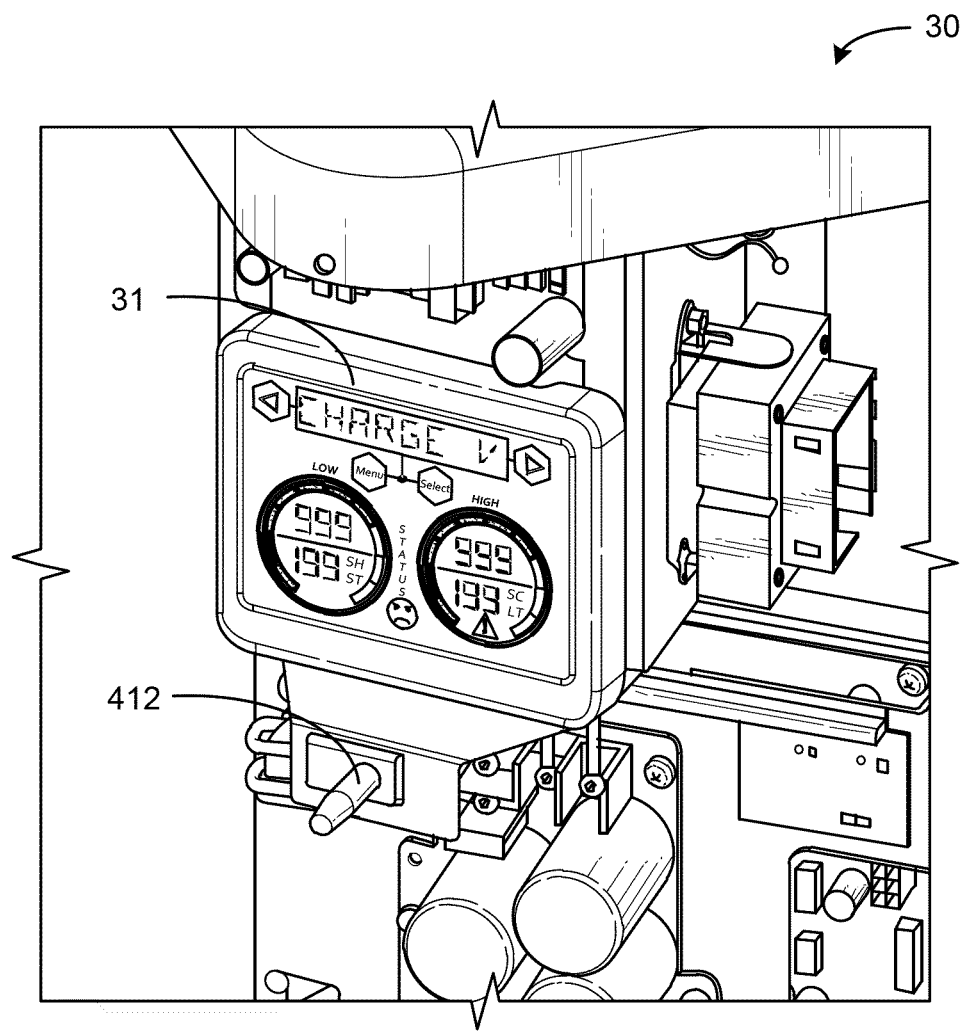
FIG. 7 is a schematic drawing of the user interface and the outdoor unit of FIGS. 1-4, according to one exemplary embodiment.
Figure 8:
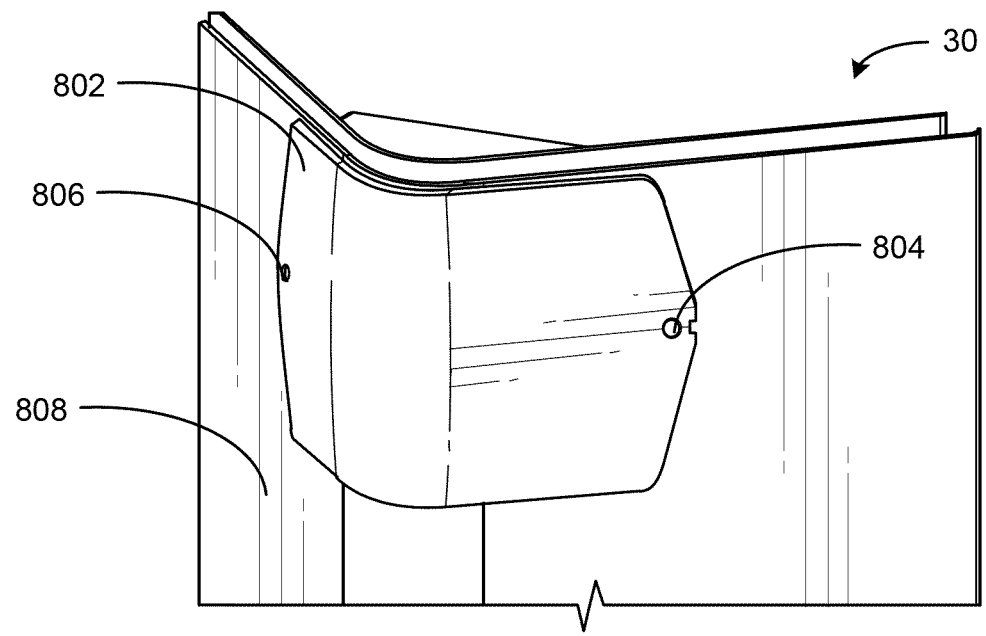
FIG. 8 is another schematic drawing of the user interface and the outdoor unit of FIGS. 1-4, according to another exemplary embodiment.
Figure 9:
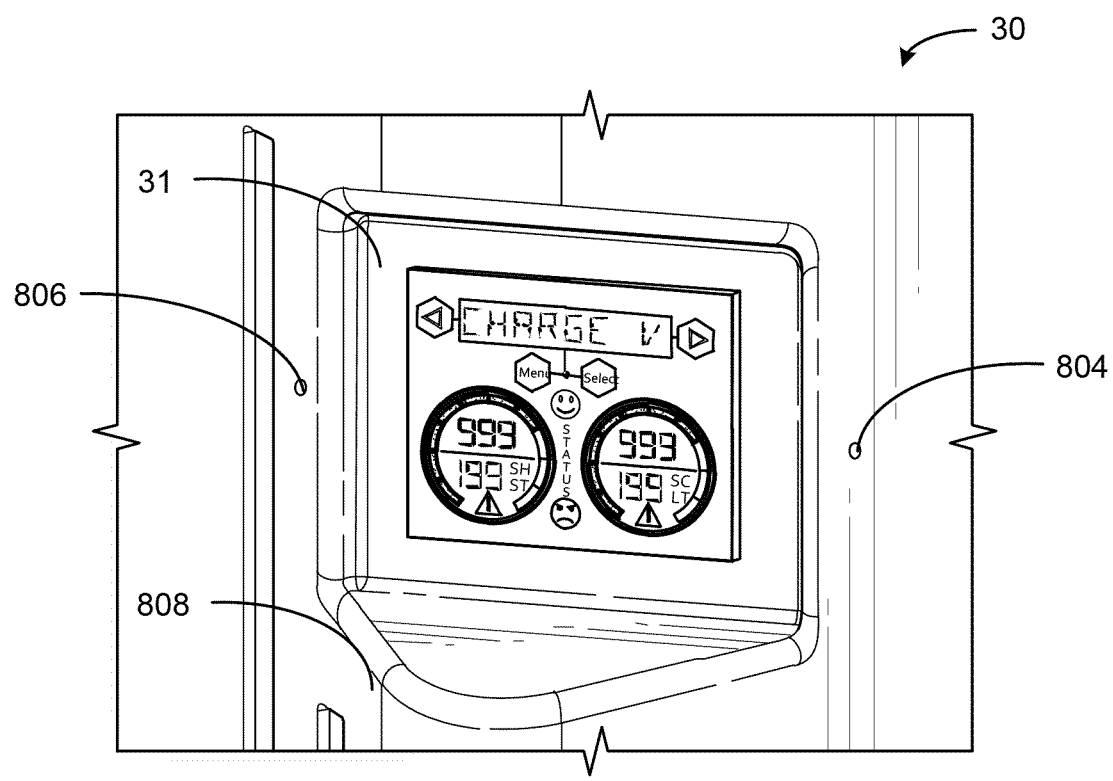
FIG. 9 is another schematic drawing of the user interface and the outdoor unit of FIGS. 1-4, according to another exemplary embodiment.
Figure 10:
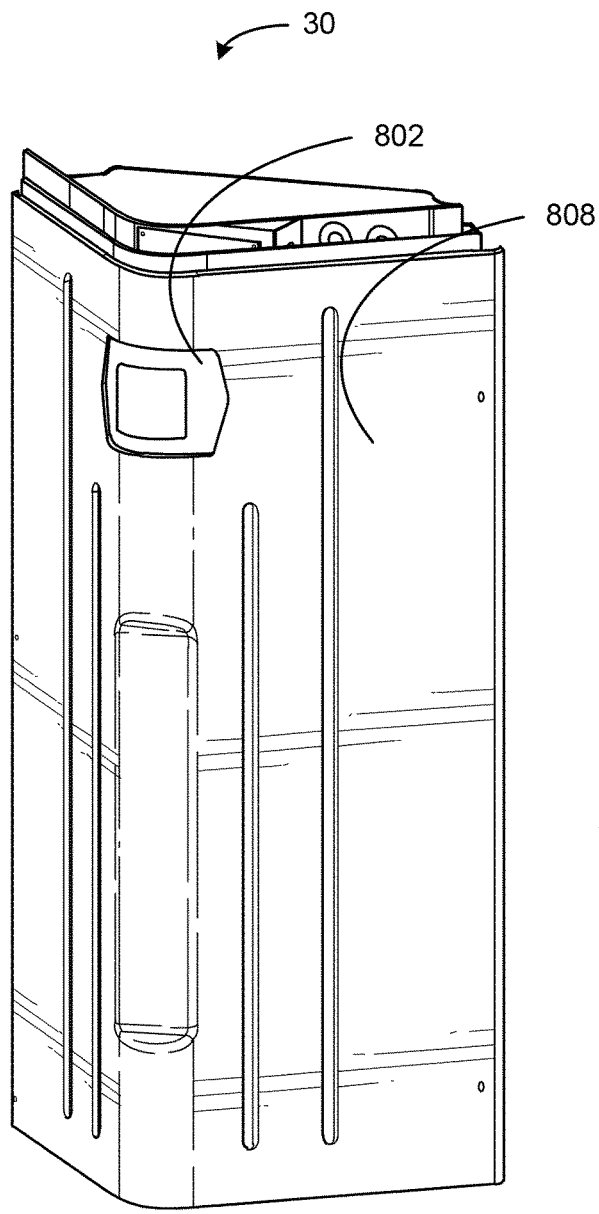
FIG. 10 is another schematic drawing of the user interface and the outdoor unit of FIGS. 1-4, according to another exemplary embodiment.
Figure 11:
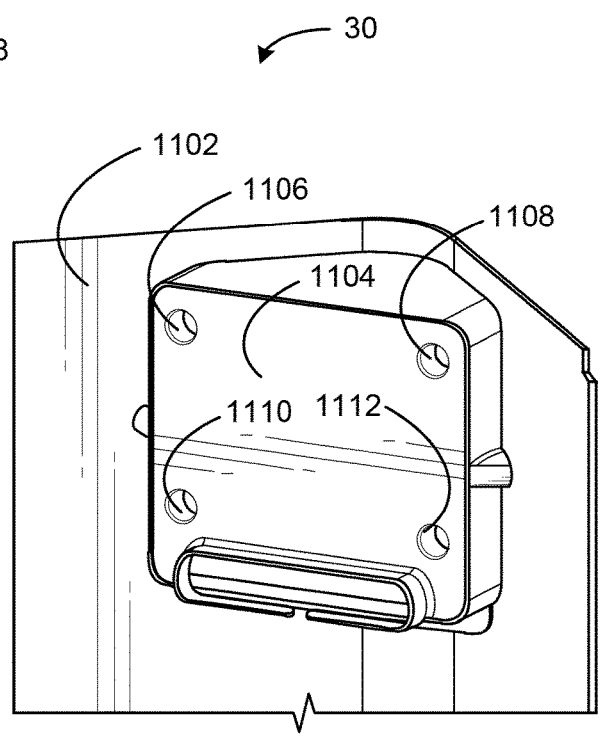
FIG. 11 is another schematic drawing of the user interface and the outdoor unit of FIGS. 1-4, according to another exemplary embodiment.

Referring now to FIGS. 7-11, outdoor unit 30 is shown, according to an exemplary embodiment. FIGS. 7-11 display various embodiments and views of outdoor unit 30 and user interface 31. Specifically, FIG. 7 depicts user interface 31 and door switch 412, FIG. 8 depicts door 802 covering user interface 31, FIG. 9 depicts user interface 31 with door 802 removed, FIG. 10 depicts outdoor unit 30 and door 802, while FIG. 11 depicts a mounting construction for user interface 31. In FIGS. 7-11, a door 802, door switch 412, and user interface 31 are shown. Door 802 may cover user interface 31 and may attach to enclosure 808. Enclosure 808 may be any enclosure, cover, and/or case for outdoor unit 30. In some embodiments, door 802 is screwed onto an enclosure via right screw 804 and left screw 806. In some embodiments, right screw 804 and left screw 806 are snaps and/or any other type of connector for connecting door 802 to enclosure 808. In various embodiments, door 802 has one or more latches and one or more door hinges allowing for door 802 to be quickly removed to access user interface 31. In some embodiments, door switch 412 is a push button. When door 802 is closed, the button may be pushed (i.e., activated). When door 802 is open, the button may be deactivated. Activating and deactivating door switch 412 may cause user interface 31 to automatically turn on and/or automatically turn off by outdoor controller 306.

FIG. 11 shows a mounting plate 1104 for user interface 31. Mounting plate 1104 may be raised from surface 1102. In various embodiments, user interface 31 can be connected to mounting plate 1104 via one or more screws and/or connectors. In some embodiments, the screws or connectors attach to top left connector 1106, top right connector 1108, bottom left connector 1110, and bottom right connector 1112.

Figure 12:
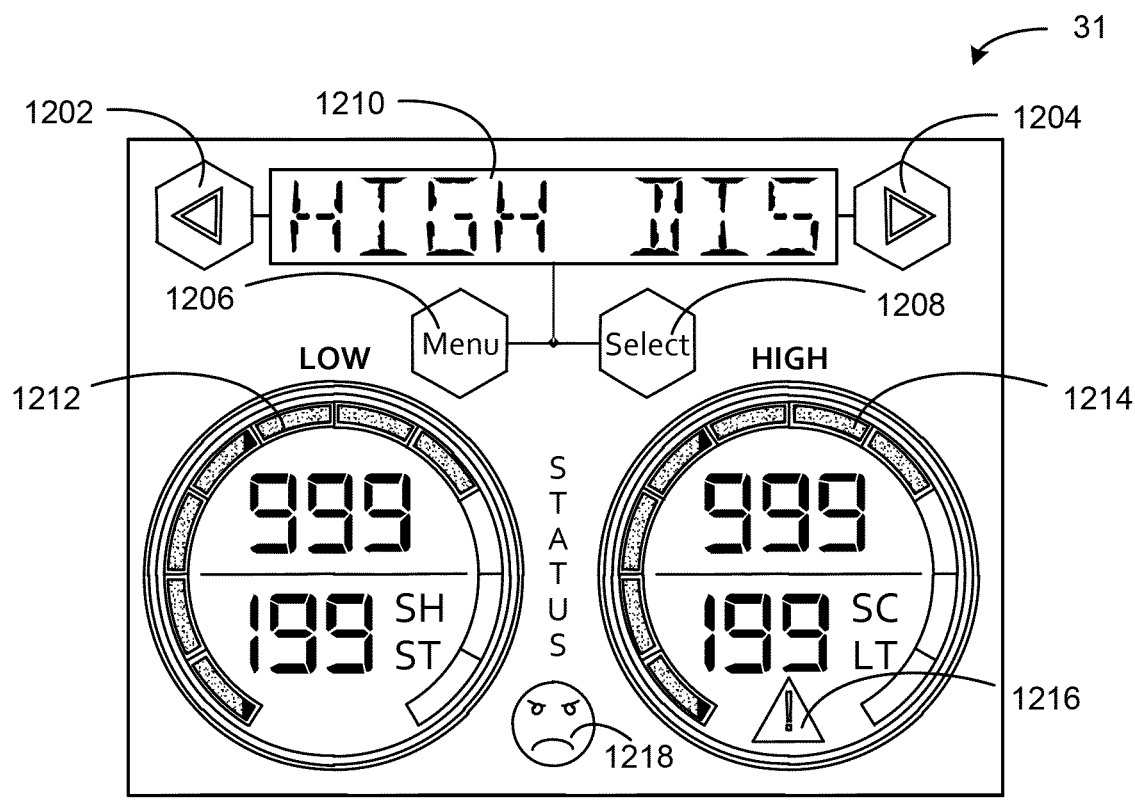
FIG. 12 is a schematic drawing of the user interface of FIGS. 1-4 displaying various system information, according to one exemplary embodiment.
Figure 13:
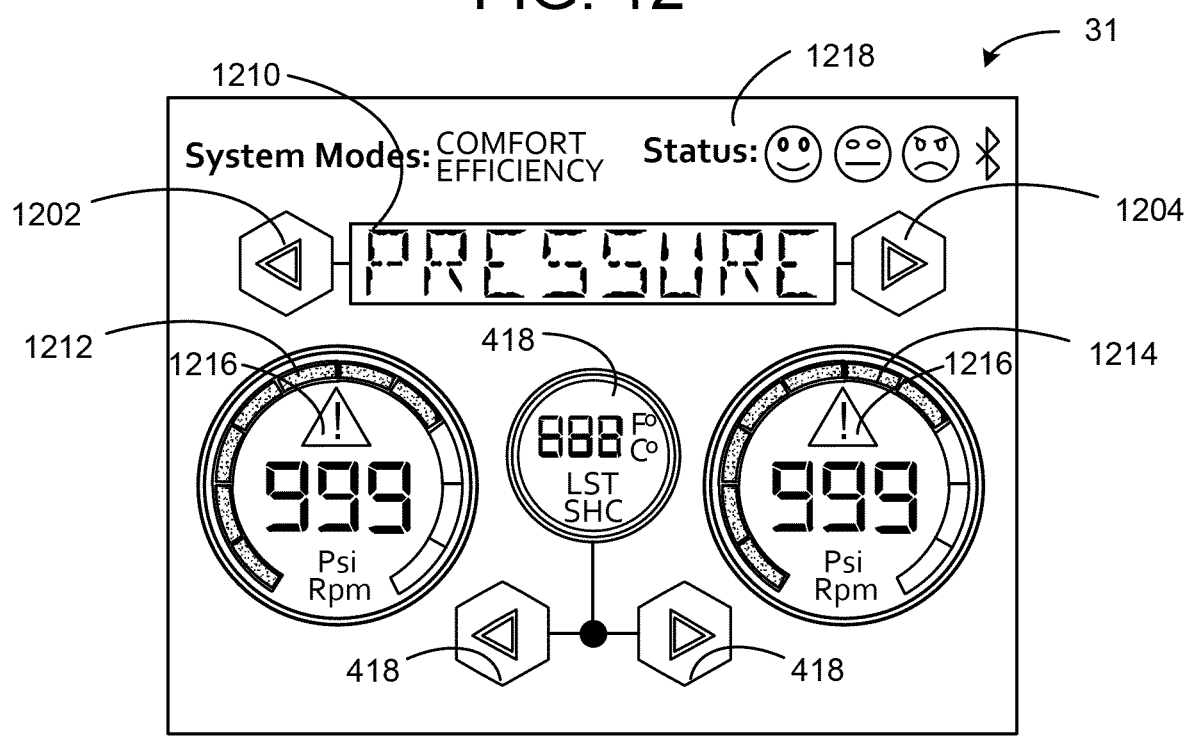
FIG. 13 is another schematic drawing of user interface of FIGS. 1-4 displaying various system information, according to another exemplary embodiment.

Referring now to FIGS. 12-13, examples of user interface 31 displaying and/or scrolling information are shown in FIGS. 12-13 according to various exemplary embodiments. In some embodiments, various buttons may be displayed on user interface 31. In some embodiments, the buttons are a scroll left button 1202, a scroll right button 1204, a menu button 1206 and/or a select button 1208. These buttons may allow a user to navigate a menu of user interface 31. In various embodiments, the buttons are virtual touch screen buttons. The buttons may also be physical push buttons.

User interface 31 may be configured to display scrolling message 1210. The message may contain various measured and/or calculated values of outdoor unit 30. In some embodiments, the scrolling message includes compressor speed, outdoor fan speed, electronic expansion valve position (e.g., valve steps), indoor fan flow, input inverter current, input inverter voltage, input inverter power, and/or any other value.

In some embodiments, user interface 31 may display a suction pressure, a discharge pressure, a liquid line pressure, a suction line temperature, a discharge line temperature, a liquid line temperature, a superheat value, and/or a subcool value. In some embodiments, user interface 31 may include a low digital gauge 1212 and a high digital gauge 1214. The low digital gauge 1212 and the high digital gauge 1214 may be proportional to the value they represents. Low digital gauge 1212 and the high digital gauge 1214 may be used to display a superheat value, a subcool value, a discharge line temperature, suction line temperature, a discharge line pressure, and/or a suction line pressure. In some embodiments, high digital gauge 1214 can be configured to display discharge temperature, liquid line temperature, discharge line pressure, liquid line pressure etc. Low digital gauge 1212 can be configured to display superheat, suction line temperature, and/or suction line pressure. Low digital gauge 1212 and high digital gauge 1214 can be configured to display circular bars which visually represent a certain amount of pressure and/or temperature on a scale. Further, low digital gauge 1212 and high digital gauge 1214 can be configured to display the values for pressure and/or temperature as decimal values as shown.

In some embodiments, user interface 31 is configured to display a fault message on scrolling message 1210. The message 1210 may indicate what fault is currently present for the system and/or what measured and/or computed value for the system is above and/or below a predefined threshold. User interface 31 displays "High DIS" which refers to a high discharge pressure and/or temperature. This may be displayed on user interface 31 in response to a determination that the discharge pressure measured in the discharge line is above a predefined threshold and/or that the discharge temperature is above and/or below a predefined amount. Any measured and/or calculated value for outdoor unit 30 that is above and/or below a predefined threshold may be displayed.

In FIGS. 12-13, warning triangle 1216 is shown on high gauge 1214 and/or low gauge 1212. In various embodiments, the warning triangle 1212 may indicate to a technician that there is a fault in the system and/or a system value (i.e., subcool, superheat, compressor speed, liquid line temperature, suction line temperature, discharge line temperature, suction line pressure, discharge line pressure, liquid line pressure, etc.) is above and/or below a predefined threshold. Further status indicator 1218 may indicate a current state with a face symbol. In some embodiments the face is a smile, a frown, and/or a straight face. The smile may indicate that no system faults are present in outdoor unit 30, the frown may indicate that a fault and/or serious fault is present, while a straight face may indicate that there is a system fault and/or that the fault is not serious and/or a component of outdoor unit 30 needs to be serviced.

High gauge 1214 may display the liquid line pressure as a numerical value and on a circular gauge. In some embodiments, the gauge is made up of one or more segments, each segment representing a predefined amount of pressure. High gauge 1214 is also shown to include a subcool value and a liquid line temperature and/or discharge line temperature. In some embodiments, the high gauge 1214 is configured to alternate between displaying the subcool value and/or the liquid line temperature and/or the discharge line temperature. If residential unit 418 determines that the liquid line pressure, the discharge line pressure, the subcool value, the liquid line temperature, and/or the discharge line temperature are above and/or below a predefined threshold, outdoor controller 306 may be configured to cause triangle warning symbol 1216 to be displayed on the high gauge 1214.

Low gauge 1212 may display the suction line pressure as a numerical value and on a circular gauge. In some embodiments, the gauge is made up of one or more segments, each segment representing a predefined amount of pressure. Low gauge 1212 is also shown to include a superheat value and a suction line temperature. In some embodiments, the low gauge 1212 is configured to alternate between displaying the superheat value and/or the suction line temperature. If outdoor controller 306 determines that the suction line pressure, the subcool value, and/or the suction line temperature is above and/or below a predefined threshold, outdoor unit 30 may be configured to cause a triangle warning symbol 1216 to be displayed on the low gauge 1212 which may indicate what value is currently affected by the system fault.

Figure 14:
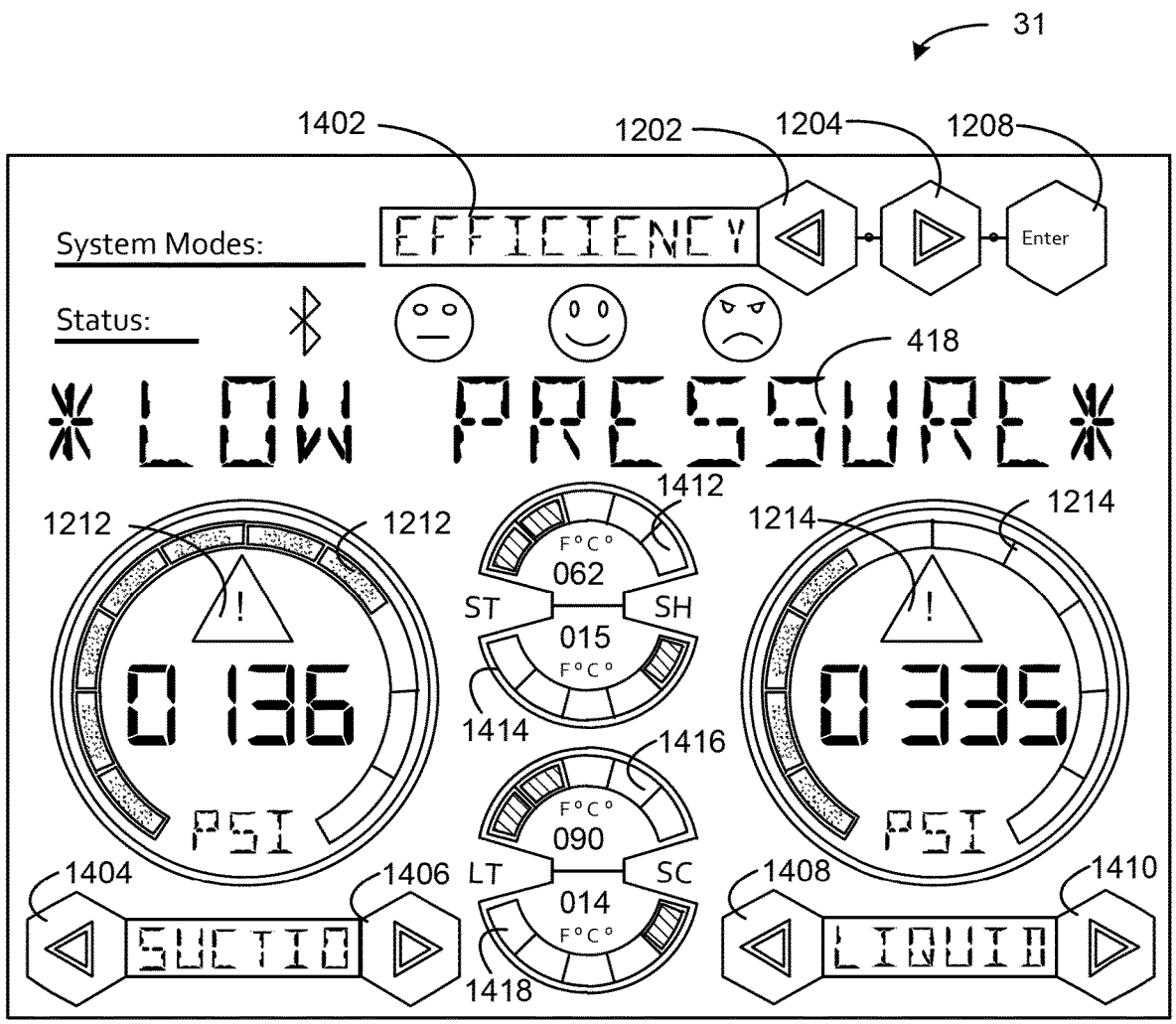
FIG. 14 is another schematic drawing of the user interface of FIGS. 1-4 displaying various system information, according to an exemplary embodiment.

Referring now to FIG. 14, user interface 31 is shown, according to an exemplary embodiment. Various buttons such as scroll left button 1202, scroll right button 1204, select button 1208 are described with reference to FIGS. 12-13. Further, low gauge 1212, high gauge 1214, and warning triangle 1216 are described with reference to FIGS. 12-13. FIG. 14 shows user interface 31 including a system mode indication 1402. In this regard, user interface 31 can be configured to display the current operating mode of outdoor unit 30 (e.g., efficiency mode, comfort mode, test mode, etc.). User interface 31 is further shown to include selector 1404 and selector 1406. Selector 1404 and selector 1406 may allow a user to change the value being displayed on low gauge 1212. For example, a user may press selector 1404 and 1406 to display various values on low gauge 1212 (e.g., suction line temperature, suction line pressure, etc.). Similarly, selectors 1408 and 1410 can be configured to change the value being displayed on high gauge 1214. For example, a user may press selector 1408 and selector 1410 to cause high gauge 1214 to display various values (e.g., liquid line pressure, liquid line temperature, discharge line pressure, discharge line temperature, etc.).

Gauge 1412 may be configured to display the suction line temperature measured by system measurement components 402. In some embodiments, gauge 1412 can be configured to display a numerical value in addition to turning on an appropriate number of segments to represent the value of suction temperature. Gauge 1414 can be configured to display the superheat value determined by outdoor controller 306 via the measurements of system measurement components 402. In some embodiments, gauge 1414 can be configured to display the superheat as a numerical value in addition to turning on an appropriate number of segments to represent the value of superheat.

Gauge 1416 may be configured to display the liquid line temperature measured by system measurement components 402. In some embodiments, gauge 1416 can be configured to display a numerical value in addition to turning on an appropriate number of segments to represent the value of liquid line temperature. Gauge 1418 can be configured to display a subcool value determined by outdoor controller 306 determined via measurements made by system measurement components 402. Gauge 1418 can be configured to display a numeral value in addition to turning on an appropriate number of segments to represent the subcool value.

Figure 15:
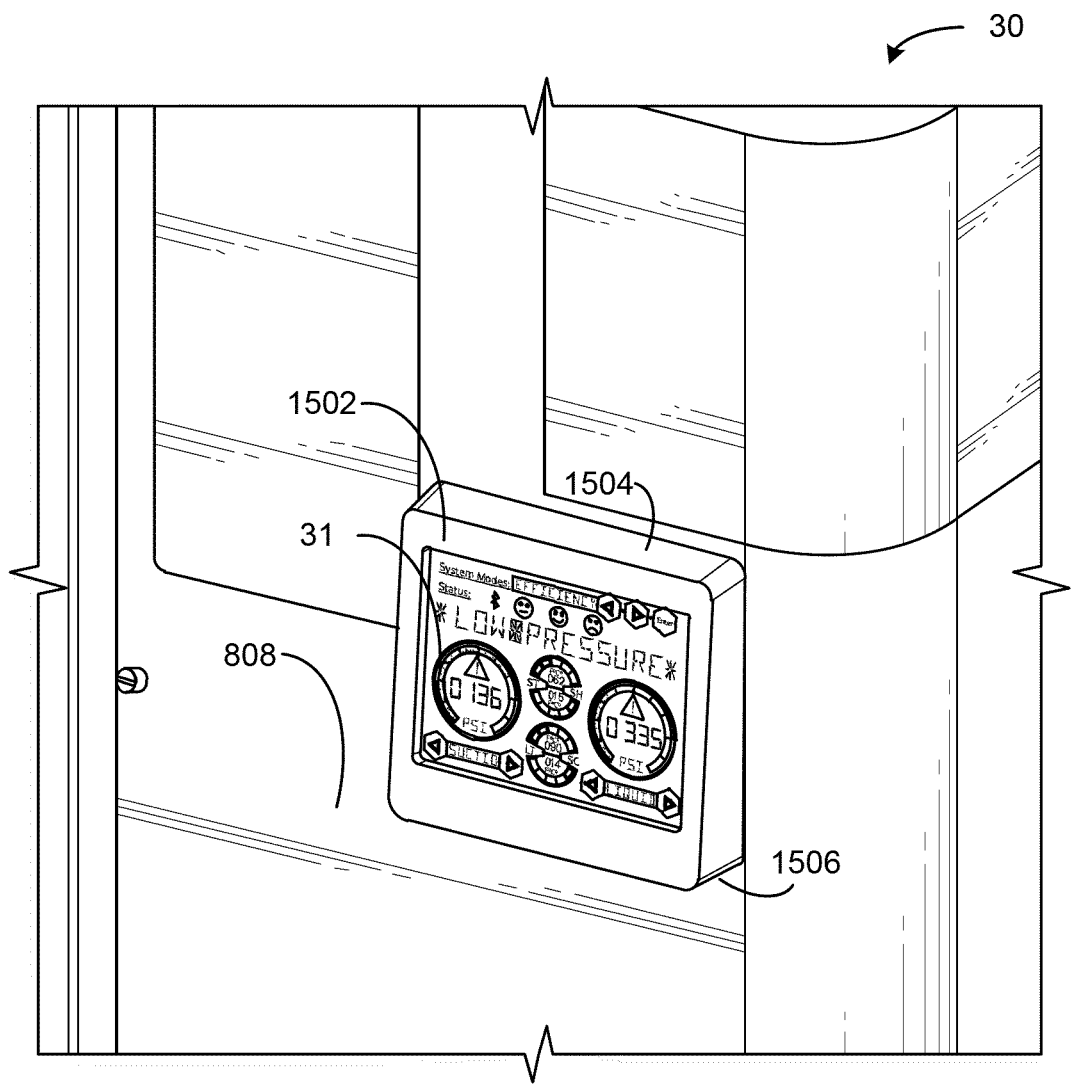
FIG. 15 is a schematic drawing of the user interface of FIGS. 1-4 coupled to the outside of the outdoor unit of FIGS. 1-4, according to an exemplary embodiment.

Referring now to FIG. 15, outdoor unit 30 is shown displaying user interface 31, according to an exemplary embodiment. FIG. 15 is a cutaway of the exterior of outdoor unit 30. The enclosure of outdoor unit 30, enclosure 808, is shown. Display shroud 1502, is shown to be connected to the surface of enclosure 808. Display shroud 1502 is shown to include user interface 31. In this regard, display shroud 1502 may protect user interface 31 from weather elements (e.g., rain, snow, etc.). In some embodiments, display shroud 1502 is oblique to enclosure 808, that is, the top 1504 of display shroud is a predefined amount closer to enclosure 808 than the bottom 1506 of display shroud 1502. Display shroud 1502 is depicted to raise user interface 31 a predefined amount perpendicular to enclosure 808.

Figure 16:
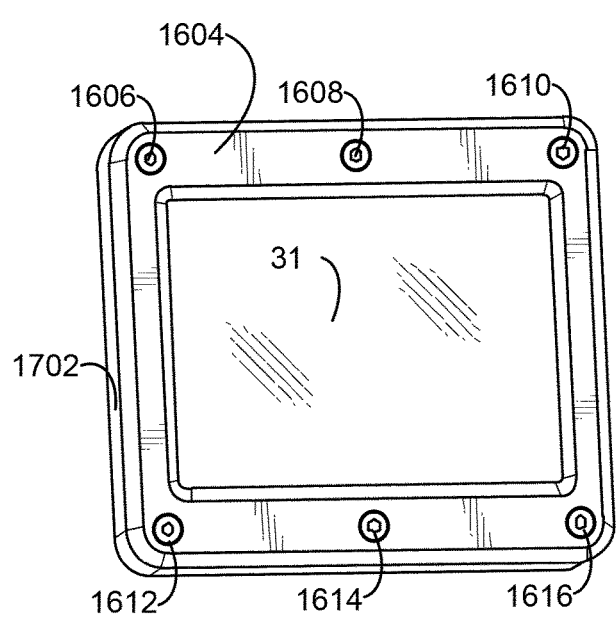
FIG. 16 is a schematic drawing of the user interface of FIGS. 1-4 with a protective cover, according to an exemplary embodiment.
Figure 17:
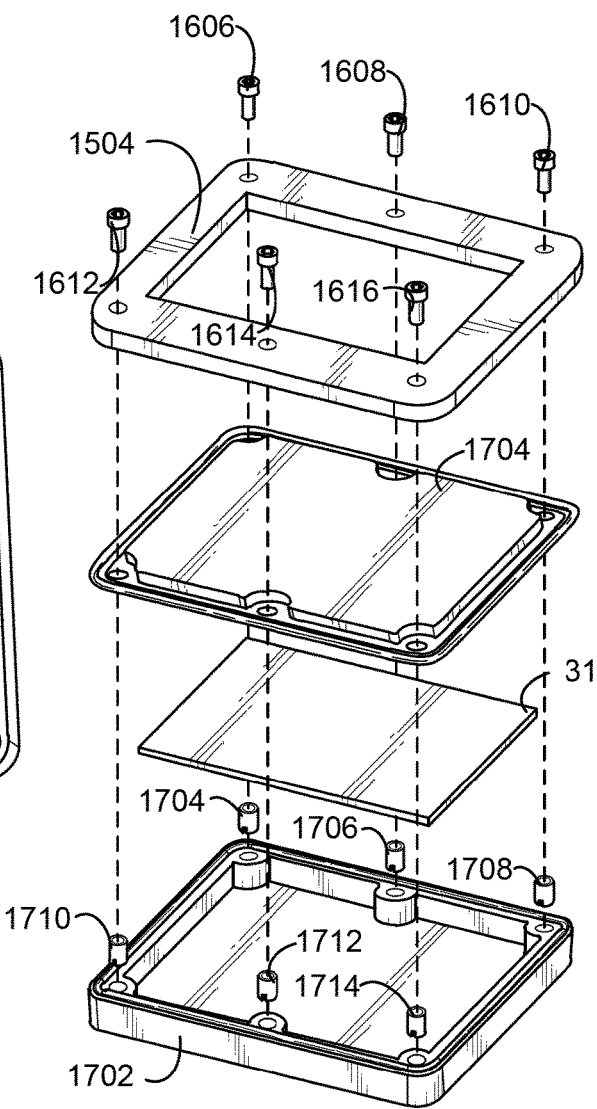
FIG. 17 is another schematic drawing of the user interface of FIGS. 1-4 with a protective cover, according to another exemplary embodiment.

Referring now to FIGS. 16-17, user interface 31 is shown, according to various exemplary embodiments. FIGS. 16-17 show various embodiments and/or views of an injection molded plastic case for user interface 31. The plastic case may be designed to be weather resistant (e.g., resistant to rain, snow, high temperature, low temperature etc.). FIG. 16 is a front view of the case. Front section 1604 is shown to be attached to back section 1702 via connectors 1606-1616. Connectors 1606-1616 may be screws, snaps, and/or any other type of connector. Top left connector 1606, top middle connector 1608, top right connector 1610, bottom left connector 1612, bottom middle connector 1614, and bottom right connector 1616 may be connectors which hold front section 1604 to back section 1702. In this regard, connectors 1606-1616 and front section 1604 and 1702 may create an airtight and/or water resistant enclosure for user interface 31.

FIG. 17 is a cross section drawing of the case for user interface 31. Drawing 1700 is shown to include connectors 1606-1616. Further, bottom connectors 1704-1714 may couple connectors 1606-1616 to bottom section 1702. In some embodiments, bottom connectors 1704-1714 are spacers. In some embodiments, bottom connectors create an airtight and/or water tight seal between top section 1604 and 1702. Further, drawing 1700 is shown to include gasket 1704. Gasket 1704 may protect user interface 31 from water and/or any other element. In this regard, gasket 1704 may sit flush with user interface 31 and create an airtight and/or water tight seal between user interface 31 and outdoor air.

Figure 18:
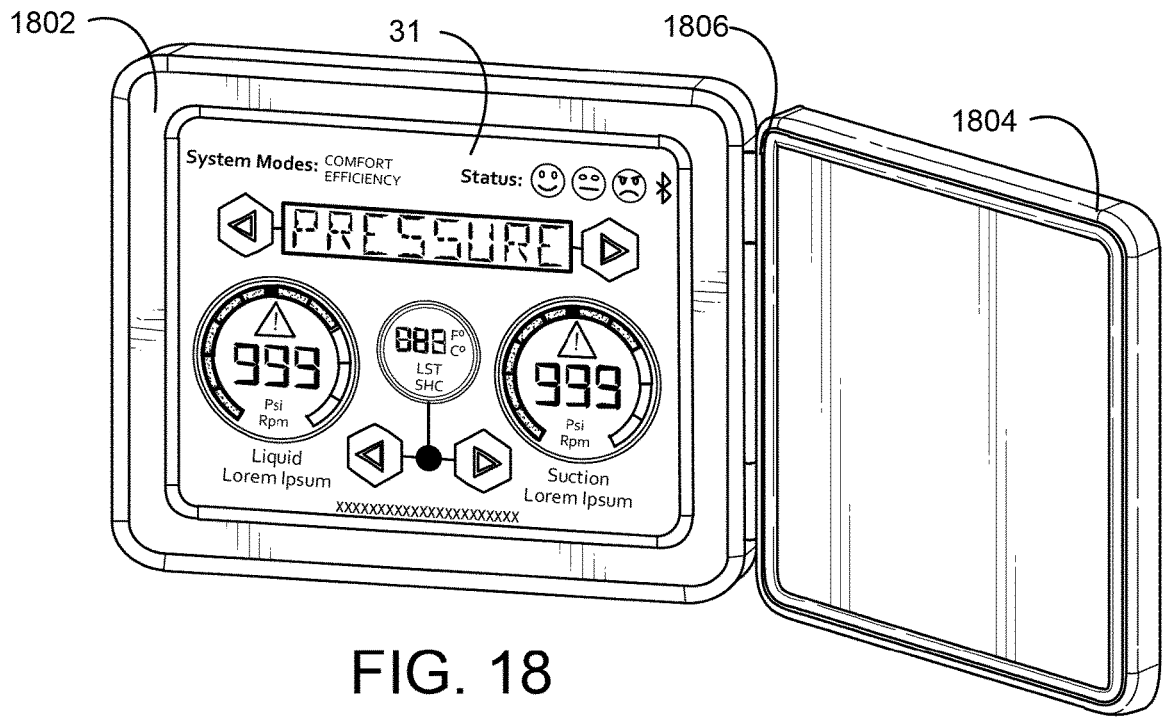
FIG. 18 is a schematic drawing of the user interface of FIGS. 1-4 with a protective cover with a hinged door, according to an exemplary embodiment.
Figure 19:
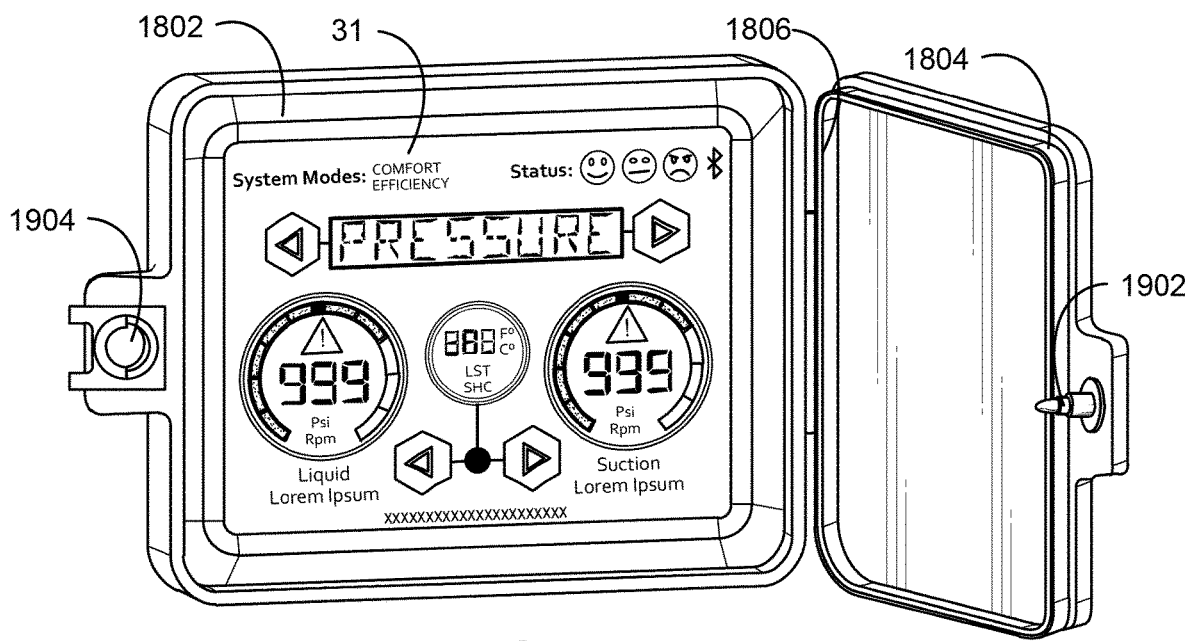
FIG. 19 is another schematic drawing of the user interface of FIGS. 1-4 with a protective cover with a hinged door, according to another exemplary embodiment.

Referring now to FIGS. 18-19, user interface 31 is shown with a hinged cover. FIG. 18 displays a case 1802 which may be the case described with reference to FIGS. 16-17 and/or shroud 1502 as described with reference to FIG. 15. Hinged cover 1804 is shown to be attached to case 1802 via hinge 1806. In some embodiments, hinged cover 1804 is a solid colored cover (i.e., is not transparent). In some embodiments, hinged cover 1804 and/or a section and/or portion of hinged cover 1804 is transparent (e.g., a glass material, a transparent plastic material, etc.). In some embodiments, hinge 1806 may be any plastic and/or metal hinge which allows hinged cover 1804 to close and become flush with case 1802. In drawing 1900, door connector 1902 and connector receiver 1904 are shown. Door connector 1902 is shown to be connected to door 1804 while connector receiver 1904 is shown to be connected to case 1802. In this regard, if hinged cover 1804 is closed, door connector 1902 clips and/or connects to connector receive 1904 and holds hinged cover 1804 flush with case 1802.

Figure 20:
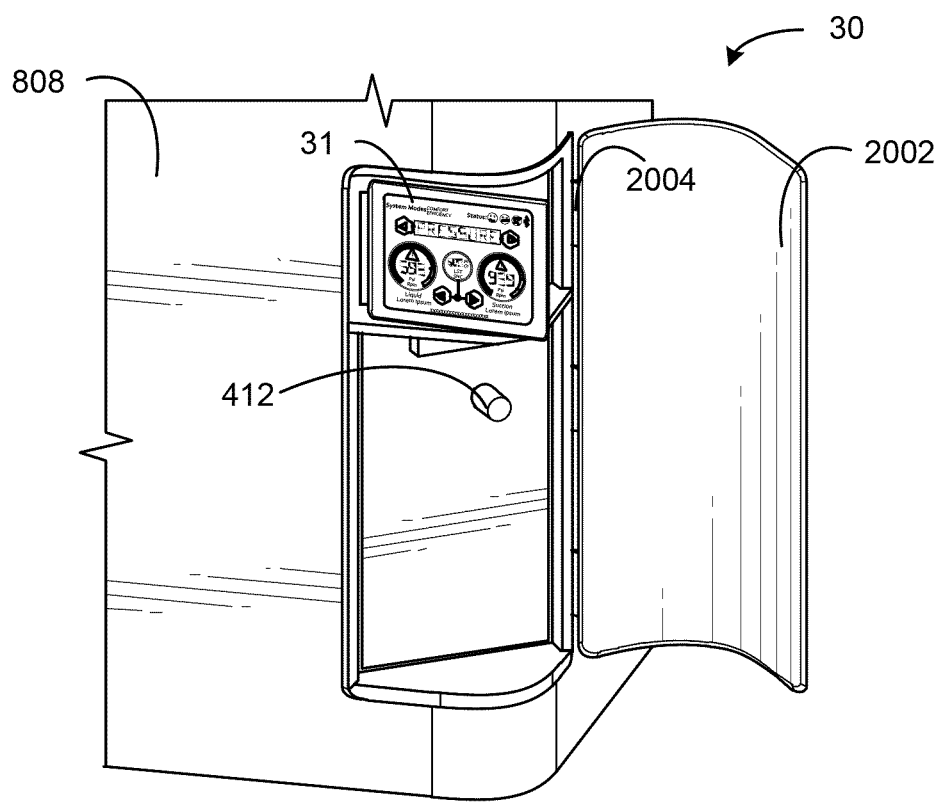
FIG. 20 is a schematic drawing of the user interface of FIGS. 1-4 and the outdoor unit of FIGS. 1-4 with a hinged door coupled to an enclosure of the outdoor unit, according to an exemplary embodiment.
Figure 21:
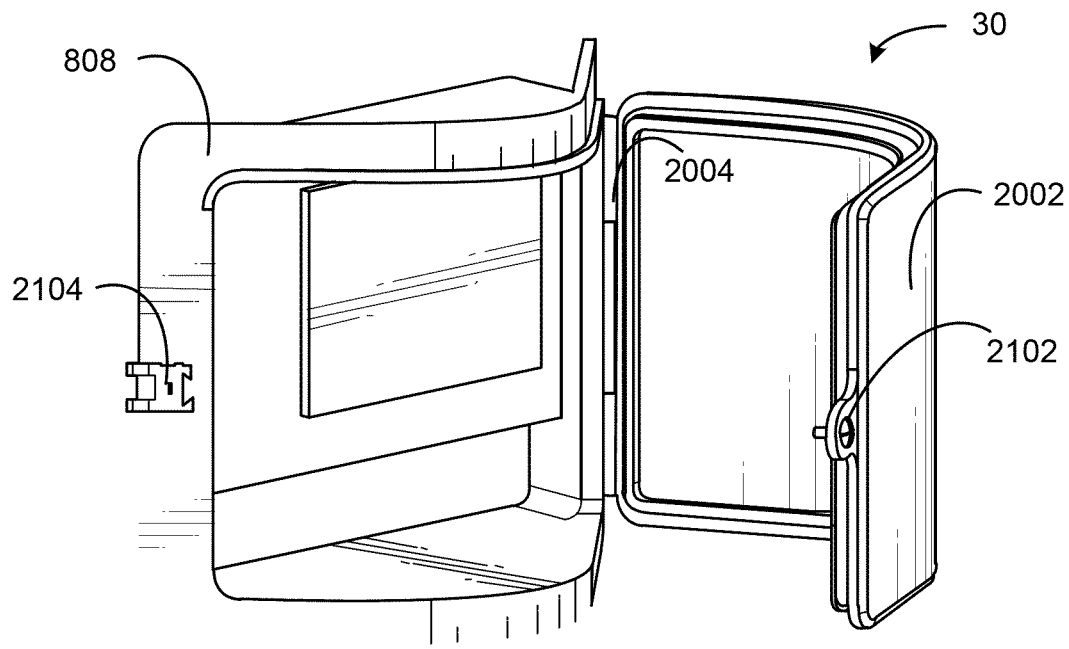
FIG. 21 is another schematic drawings of the user interface of FIGS. 1-4 and the outdoor unit of FIGS. 1-4 with a hinged door coupled to an enclosure of the outdoor unit, according to another exemplary embodiments.

Referring now to FIGS. 20-21, outdoor unit 30 is shown, according to various exemplary embodiments. FIGS. 20-21 depict embodiments of enclosure 808. In FIGS. 20-21, enclosure 808 includes an enclosure door 2002 attached to enclosure 808 via hinging mechanism 2004. In some embodiments, enclosure door 2002 may be any plastic, metal, and/or any other transparent and/or non-transparent material. In FIG. 20, door switch 412 is shown. Enclosure door 2002 may be configured to press door switch 412. In this regard, outdoor controller 306 may be able to turn on and/or turn off user interface 31 based on the position of enclosure door 2002. In FIG. 21, enclosure door 2002 is shown to include a connector 2102 while enclosure 808 is shown to a connector receiver 2104. In this regard, connector 2102 can latch, connect, and/or otherwise be coupled to connector receiver 2104 when enclosure door 2002 is closed. This may keep enclosure door 2002 properly and/or securely connected to enclosure 808.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An outdoor unit for a building, the outdoor unit comprising:
   a compressor configured to compress refrigerant within a refrigeration circuit, the refrigeration circuit configured to be connected to an indoor unit located within the building;
   a sensor configured to measure a condition of at least one of the outdoor unit or the refrigerant;
   a display device comprising a display; and
   a controller coupled to the display device and the sensor;
   an enclosure structured to enclose the compressor, the sensor, the display device, and the controller, wherein the enclosure comprises an opening exposing the display of the display device while the compressor, the sensor, and the controller are enclosed;
   wherein the controller is configured to:
     receive the condition from the sensor;
     generate display information on the display based on the condition, wherein the display information includes a plurality of characters forming a word in a spoken language; and
     cause the display device to display the display information by scrolling the plurality of characters across the display.

2. The outdoor unit of claim 1, wherein the condition comprises a fault experienced by the outdoor unit, and the display information includes an indication of the fault experienced by the outdoor unit.

3. The outdoor unit of claim 1, wherein the outdoor unit further comprises a variable speed drive configured to control the compressor and a power sensor configured to measure power consumption of the variable speed drive;
   wherein the controller is configured to:
     receive the power consumption of the variable speed drive from the power sensor; and
     cause the display device to display the power consumption as part of the display information.

4. The outdoor unit of claim 1, wherein the outdoor unit further comprises an electronic expansion valve (EEV) comprising a motor;
   wherein the controller is configured to:
     determine a step value of the motor of the EEV; and
     cause the display device to display the step value of the motor of the EEV.

5. The outdoor unit of claim 1, wherein the controller is configured to:
   determine if the refrigeration circuit is properly charged via the sensor; and cause the display device to display an indication of a charge of the refrigeration circuit.

6. The outdoor unit of claim 1, wherein the controller is configured to:
determine a compressor speed of the compressor; and
cause the display information to include the compressor speed.

7. The outdoor unit of claim 1, wherein the display device is configured to receive input from a user via the display via a select button and a menu button of the display; and
wherein the controller is configured to select an operating mode for the outdoor unit based on the input received via the display.

8. The outdoor unit of claim 1, wherein the outdoor unit comprises a first temperature sensor that measures refrigerant temperature of a liquid line of the refrigeration circuit, a second temperature sensor that measures refrigerant temperature of a discharge line of the refrigeration circuit, and a third temperature sensor that measures refrigerant temperature of a suction line of the refrigeration circuit.

9. The outdoor unit of claim 8, wherein the outdoor unit comprise a first pressure sensor that measures refrigerant pressure of the liquid line of the refrigeration circuit, a second pressure sensor that measures refrigerant pressure of the discharge line of the refrigeration circuit, and a third pressure sensor that measures refrigerant pressure of the suction line of the refrigeration circuit;
wherein the controller is configured to cause the display device to display a liquid line pressure, a discharge line pressure, a suction line pressure, a liquid line temperature, a discharge line temperature, and a suction line temperature.

10. The outdoor unit of claim 1, wherein the outdoor unit comprises a fan;
wherein the controller is configured to:
receive an airflow value and a fan speed value of the fan; and
cause the display device to display the airflow value and the fan speed value of the fan.

11. The outdoor unit of claim 10, wherein the controller is configured to receive the airflow value of the fan from a flow meter.

12. The outdoor unit of claim 1, wherein the outdoor unit includes a plurality of sensors including temperature sensors configured to measure temperature values and pressure sensors configured to measure pressure values;
wherein the controller is configured to:
cause the display device to display a first characteristic of a suction line of the refrigeration circuit in a low digital gauge of the display and a second characteristic of a discharge line of the refrigeration circuit or a liquid line of the refrigeration circuit in a high digital gauge of the display.

13. The outdoor unit of claim 12, wherein the controller is configured to:
determine a subcool value and a superheat value for the refrigeration circuit based on the temperature values and the pressure values; and
cause the display device to display the subcool value and the superheat value.

14. The outdoor unit of claim 1, wherein the outdoor unit further comprises a switch, wherein the controller is further configured to determine if the switch is activated or deactivated and turn the display device on if the switch is activated and turn the display device off if the switch is deactivated.

15. The outdoor unit of claim 14, wherein the enclosure further comprises a door selectively covering the opening, and wherein the switch is deactivated when the door covers the opening.

16. An outdoor unit for a building, the outdoor unit comprising:
a compressor configured to compress refrigerant within a refrigeration circuit, the refrigeration circuit configured to be connected to an indoor unit located within the building;
a sensor configured to measure a condition of at least one of the outdoor unit or the refrigerant;
a display device comprising a display;
a controller configured to:
receive the condition from the sensor;
generate display information on the display based on the condition, wherein the display information includes a plurality of characters forming a word in a spoken language; and
cause the display device to display the display information by scrolling the plurality of characters across the display; and
an enclosure comprising an opening exposing the display of the display device, wherein the enclosure and the display of the display device are structured to enclose the compressor, the sensor, and the controller while the display of the display device is exposed.

17. The outdoor unit of claim 16, wherein the condition comprises a fault experienced by the outdoor unit, and the display information includes an indication of the fault experienced by the outdoor unit.

18. The outdoor unit of claim 16, wherein the display device is configured to receive input from a user via the display via a select button and a menu button of the display; and
wherein the controller is configured to select an operating mode for the outdoor unit based on the input received via the display.

19. The outdoor unit of claim 16, wherein the outdoor unit further comprises a switch, wherein the controller is further configured to determine if the switch is activated or deactivated and turn the display device on if the switch is activated and turn the display device off if the switch is deactivated.

20. The outdoor unit of claim 16, wherein the controller is further configured to cause the display device to display a menu button, a select button, a low digital gauge displaying a characteristic of a suction line of the HVAC system, and a high digital gauge displaying a characteristic of a discharge line of the HVAC system or a liquid line of the HVAC system.

* * * * *